US009897302B2

(12) United States Patent
Flaherty et al.

(10) Patent No.: US 9,897,302 B2
(45) Date of Patent: *Feb. 20, 2018

(54) FLAT LED LAMP ASSEMBLY

(71) Applicant: Differential Energy Products, LLC, Port Orchard, WA (US)

(72) Inventors: Richard A. Flaherty, Grapeview, WA (US); Christopher A. Burton, Bremerton, WA (US); Phil Ahrens, Bainbridge Island, WA (US)

(73) Assignee: Differential Energy Products, LLC, Port Orchard, WA (US)

( * ) Notice: Subject to any disclaimer, the term of this patent is extended or adjusted under 35 U.S.C. 154(b) by 306 days.

This patent is subject to a terminal disclaimer.

(21) Appl. No.: 14/493,251

(22) Filed: Sep. 22, 2014

(65) Prior Publication Data

US 2015/0009671 A1    Jan. 8, 2015

Related U.S. Application Data

(63) Continuation of application No. 13/546,959, filed on Jul. 11, 2012, now Pat. No. 8,882,297, which is a (Continued)

(51) Int. Cl.
*F21V 29/02* (2006.01)
*F21V 29/76* (2015.01)
(Continued)

(52) U.S. Cl.
CPC ............... *F21V 29/02* (2013.01); *F21K 9/20* (2016.08); *F21K 9/23* (2016.08); *F21V 17/12* (2013.01);
(Continued)

(58) Field of Classification Search
CPC .. F21Y 2105/10; F21Y 2115/10; F21K 9/235; F21K 9/237; F21K 9/238;
(Continued)

(56) References Cited

U.S. PATENT DOCUMENTS 3,885,185 A * 5/1975 Tilley ..................... H01K 1/42
313/315
6,793,374 B2 * 9/2004 Begemann .............. F21V 3/00
362/249.01

(Continued)

*Primary Examiner* — Hargobind S Sawhney
(74) *Attorney, Agent, or Firm* — Perkins Coie LLP

(57) ABSTRACT

An LED-based lamp assembly for use with a light fixture having a socket portion including a driver assembly having a base portion rotateably engageable with the socket portion to make a first electrical contact with the light fixture. The base portion is coupled to a driver housing. The driver assembly includes an electrically conductive tip portion coupled to the base portion. The tip portion is engageable with the socket portion to make a second electrical contact with the light fixture wherein the tip portion and driver housing are moveable relative to each other when the tip portion is in the second electrical contact with the socket portion. The driver assembly includes first electrical contacts. A lamp housing assembly is operably connected to the driver assembly. The lamp housing assembly includes second electrical contacts operatively connected to the first electrical contacts of the driver assembly.

20 Claims, 33 Drawing Sheets

Related U.S. Application Data continuation-in-part of application No. 13/370,277, filed on Feb. 9, 2012, now Pat. No. 8,845,132.

(60) Provisional application No. 61/441,239, filed on Feb. 9, 2011.

(51) Int. Cl.

| | |
|---|---|
| *F21V 19/00* | (2006.01) |
| *H05B 33/08* | (2006.01) |
| *F21V 23/00* | (2015.01) |
| *F21V 29/00* | (2015.01) |
| *F21V 17/12* | (2006.01) |
| *F21V 29/507* | (2015.01) |
| *F21K 9/20* | (2016.01) |
| *F21K 9/23* | (2016.01) |
| *F21K 9/90* | (2016.01) |
| *F21Y 115/10* | (2016.01) |

(52) U.S. Cl.
CPC ........ *F21V 19/0065* (2013.01); *F21V 23/008* (2013.01); *F21V 29/20* (2013.01); *F21V 29/507* (2015.01); *F21V 29/76* (2015.01); *H05B 33/0803* (2013.01); *F21K 9/90* (2013.01); *F21Y 2115/10* (2016.08)

(58) Field of Classification Search
CPC ........ F21V 14/02; F21V 23/00; F21V 23/003; F21V 23/0065; F21V 23/06; F21V 29/20; F21V 29/2212; F21V 29/503; F21V 29/508
USPC ............... 362/184, 196, 197, 200, 202, 208, 362/219.17, 230, 231, 234, 249.01, 362/249.02, 249.03, 249.11, 282, 287, 362/294, 372, 545, 429, 548, 549, 612, 362/646, 647, 649, 650, 652, 800, 802; 313/45, 46, 318.01, 318.09, 499, 500; 439/10, 11, 135–139, 220, 232, 237, 439/240–244, 253–257, 320, 339, 370, 439/447, 620.02, 620.22, 620.25, 699.2, 439/700, 786, 815–817, 824, 859
See application file for complete search history.

(56) References Cited

U.S. PATENT DOCUMENTS

| | | | |
|---|---|---|---|
| 6,864,513 B2* | 3/2005 | Lin | F21V 29/004 257/712 |
| 7,832,900 B2* | 11/2010 | Avitan | H01K 1/64 313/580 |
| 9,131,557 B2* | 9/2015 | Vadai | F21S 2/00 |
| 2005/0254246 A1* | 11/2005 | Huang | F21V 15/01 362/362 |
| 2009/0196038 A1* | 8/2009 | Vargas Maciel | F21V 29/507 362/249.03 |
| 2011/0215697 A1* | 9/2011 | Tong | F21V 29/02 313/46 |

* cited by examiner

FLAT LED LAMP ASSEMBLY

CROSS REFERENCE TO RELATED APPLICATIONS

This application is a Continuation patent application that hereby claims priority to U.S. patent application Ser. No. 13/546,959, filed Jul. 1, 2012, titled FLAT LED ASSEMBLY, which is a Continuation-In-Part patent application of and claims priority to U.S. patent application Ser. No. 13/370,277, filed Feb. 9, 2012, titled FLAT LED LAMP ASSEMBLY, which claims priority to U.S. Provisional Patent Application No. 61/441,239 filed Feb. 9, 2011, and titled FLAT LED LAMP ASSEMBLY, all of which are incorporated herein by reference in their entirety.

TECHNICAL FIELD

Embodiments of the present invention are directed to lamp assemblies, and more particularly to LED-based lamp assemblies.

BACKGROUND

Conventional light bulbs and lamps experience significant drawbacks. High Intensity Discharge (HID) bulbs, such as Mercury vapor, high-pressure Sodium, metal halide and other high-intensity bulbs such as halogen, high-powered compact fluorescent, etc., produce high intensity light, but the bulbs typically generate a significant amount of heat, have a limited useful life, are susceptible to damage from fairly rough handling, and can be expensive. Some HID bulbs also contain mercury, such as Mercury vapor and compact fluorescents. The HID and high-intensity bulbs also typically produce light in a spherical pattern, such that a significant portion of the generated light from the bulb is blocked or disrupted by the fixtures into which these bulbs are installed. Conventional HID bulbs typically include a mogul base that screw into a mogul base socket in the light fixture. Conventional non-HID bulbs or lamp used to replace HID bulbs, such as fluorescent bulbs or LED lamps, typically require rewiring of the ballast or reconfiguration of the fixture's socket to receive the replacement bulb or lamp. This reconfiguration of the fixture can be time consuming labor intensive, and expensive.

Flat LED retro-fit lamp kits have been developed to provide improved efficiency and lighting characteristics. The conventional flat retro-fit lamps, however, typically require a fitting that mates with the light fixture so as to insure that the flat lamp is properly oriented relative to the fixture when installed. Accordingly, light fixtures that include a mogul base socket or other receptacles for HID bulbs typically have to be modified or removed and it is necessary to rewire the fixture and to remove existing ballasts and/or head fixtures with a compatible receptacle for the flat LED lamp. This retrofit process is also time consuming, labor intensive, and expensive.

Conventional incandescent light bulbs also suffer from significant drawbacks. Typical incandescent medium base light bulbs are extremely inefficient, relatively fragile, very susceptible to damage or breakage, and have fairly short useful lives. In addition, government regulations are phasing out incandescent light bulbs, including many of the medium base incandescent light bulbs sold in the residential markets. Accordingly, such medium base incandescent light bulbs will not be available in their current state and there is no guarantee that the modified hybrid incandescent light bulbs will be as efficient, provide for lower heat output or an equal light output, and there is a significant need for a lamp that overcomes the drawbacks of the conventional or the new hybrid bulbs.

SUMMARY

The present invention provides a flat LED-based lamp assembly that overcomes drawbacks experienced in the prior art and provides other benefits. One of the advantages of the claimed invention is a more efficient utilization and conservation of energy resources. At least one embodiment provides a flat LED lamp assembly having a plurality of LED lights on a circuit bed and one or more heat sinks attached to the circuit bed. A constant current driver is connected to the circuit bed and is configured to dissipate the igniter or start-up voltage used with conventional HID style light fixtures, thereby eliminating the need to bypass conventional ballast systems. The lamp assembly has a cylindrical base, such as a threaded mogul base, medium base, or other threaded lamp base. The base has a spring loaded tip that defines one of the electrical connection points with the socket of the receiving light fixture. The spring loaded tip is configured so the flat LED lamp can be rotated relative to the fixture after electrical connection is made between the tip and the fixture's socket. The spring loaded tip also acts as a tensioner to provide improved frictional engagement between the base and the socket of the fixture. The lamp assembly also has a "quick disconnect" feature separating the LED Driver circuitry from the LED circuit bed and the heat sink device. This quick disconnect feature allows for easy interchange of circuit beds/heat sink arrangements without having to replace the driver and base. The disconnect feature allows for other LED circuit bed and heat sink device assemblies to be interchanged, for example, when increased lumens or luminous lux is required.

In one embodiment, an LED-based lamp assembly has a driver assembly with a base portion rotatably engageable with a socket portion of a light fixture to make a first electrical contact with the light fixture. The driver assembly has an electrically conductive tip portion coupled to the base portion. The tip portion engages the socket portion to make a second electrical contact with the light fixture. The tip portion is retractable relative to the base portion and can retract when in electrical contact with the light fixture's socket portion. A lamp housing assembly is operably connected to the driver assembly. The lamp housing assembly has a lamp housing connected to the driver assembly, and the lamp housing has electrical contacts that operatively connected to electrical contacts on the driver assembly. The lamp housing is coupled to at least one substrate having at least one LED light thereon. The substrate is connected to, or is an integral part of, a heat sink configured to carry heat away from the substrate and/or LED light. The lamp housing assembly is rotatable relative to the light fixture to adjust the angular position of the light source while maintaining the first and second electrical contacts between the driver assembly and the socket portion.

In another embodiment, an LED-based light fixture assembly has a light fixture coupleable to a power source and that has a threaded socket portion. A driver assembly has a threaded base portion that screws into the threaded socket portion. The driver assembly has an electrically conductive, retractable tip portion coupled to the base portion and positioned to electrically engage the socket portion when the base portion is being screwed into the socket portion. The tip portion is retractable relative to the base portion after the tip portion electrically engages the socket portion and before the base portion is fully screwed into the socket portion. A lamp housing assembly is electrically connected to the driver assembly. The lamp housing assembly has a heat sink with a plurality of fins, and at least one LED substrate is mounted to the heat sink and has at least one LED light thereon. Alternately, the LED substrate and the heat sink may be one and the same. An air flow device is adjacent to the heat sink and is operable to move air over the heat sink. The heat sink is configured to carry heat away from the LED substrate and/or the LED light. The LED light source and the heat sink are rotatable as a unit relative to the light fixture to adjust the angular position of the light source while maintaining electrical engagement between the tip portion and the socket portion.

Another embodiment provides a lamp assembly for use with a light fixture having a socket. The lamp assembly comprises a driver assembly having a threaded base portion that screws into the socket. The driver assembly has an electrically conductive, retractable tip portion coupled to the base portion and positioned to electrically engage the socket when the base portion is being screwed into the socket portion. The tip portion is retractable relative to the base portion and can retract after the tip portion electrically engages the socket portion and before the base portion is fully screwed into the socket. The driver assembly has a driver housing with a first connection member spaced apart from the threaded base portion. A lamp housing assembly is removeably and electrically connected to the driver assembly. The lamp housing assembly has a lamp housing with a second connection member that releasably mates with the first connection member. The lamp housing is connected to a heat sink with an LED substrate mounted to the heat sink, wherein the LED substrate has a plurality of LED lights thereon. Alternately, the LED substrate and the heat sink may be one and the same. The LED substrate and heat sink are rotatable as a unit relative to the light fixture to adjust the angular position of the LED chip board while maintaining electrical engagement between the tip portion and the socket.

Another embodiment provides an LED-based lamp assembly comprising a driver assembly having a base portion rotatably engageable with a socket portion of a light fixture to make a first electrical contact with the light fixture. The driver assembly has an electrically conductive tip portion coupled to the base portion. The tip portion is engageable with the socket portion to make a second electrical contact with the light fixture. A lamp housing assembly is connected to the driver assembly and has a lamp housing connected to the driver assembly. The lamp housing has second electrical contacts operatively connected to the first electrical contacts. A heat sink is coupled to the lamp housing. The heat sink has a support portion and a plurality of fins coupled to the support portion. The fins form air columns between adjacent fins, and the support portion has a plurality of first apertures in communication with the air columns. The lamp housing assembly has at least one LED substrate having a plurality of second apertures therethrough and at least one LED light thereon. The LED substrate is connected to the support portion of the heat sink and the second apertures are aligned with the first apertures and aligned with the air columns. The lamp housing assembly has a fan adjacent to the heat sink with the heat sink positioned between the fan and the LED substrate. The fan is positioned to move air through the air columns in the heat sink and through the plurality of first and second apertures to move a flow of heated air away from the LED substrate. The lamp housing assembly can be rotatable relative to the light fixture to adjust the angular position of the LED substrate while maintaining the first and second electrical contacts between the driver assembly and the socket portion.

Another embodiment provides an LED-based light fixture assembly having a light fixture coupleable to a power source and having a threaded socket portion. A driver assembly has a threaded base portion that screws into the threaded socket portion. The driver assembly has an electrically conductive, tip portion coupled to the base portion and positioned to electrically engage the socket portion when the base portion is being screwed into the socket portion. A lamp housing assembly is electrically connected to the driver assembly and has a heat sink with a plurality of fins and a support portion adjacent to the fins. The support portion has a plurality of first apertures therethrough. At least one LED chip board is mounted to the heat sink, and the LED chip board has at least one LED light thereon and has a plurality of second apertures therethrough. The second apertures are coaxially aligned with the first apertures to allow airflow to pass through the support portion and through the LED chip board. The lamp housing has an air flow device adjacent to the heat sink and operable to move air over the heat sink and through the plurality of first and second apertures. The fan is configured to move the airflow away from the LED chip board in a direction of illumination of the LED light. The LED chip board and heat sink can be rotatable as a unit relative to the light fixture to adjust the angular position of the LED chip board while maintaining electrical engagement between the tip portion and the socket portion.

Yet another embodiment provides a lamp assembly for use with a light fixture having a socket. The lamp assembly has a driver assembly with a threaded base portion that screws into the socket. The driver assembly has an electrically conductive tip portion coupled to the base portion and positioned to electrically engage the socket when the base portion is being screwed into the socket portion. The driver assembly has driver housing with a first connection member spaced apart from the threaded base portion. A lamp housing assembly is removeably and electrically connected to the driver assembly. The lamp housing assembly has a lamp housing with a second connection member that releasably mates with the first connection member. The lamp housing is connected to a heat sink and an LED chip board mounted to the heat sink, wherein the LED chip board has a plurality of LED lights thereon and a plurality of first apertures therethrough. The heat sink has a support portion coupled to the LED chip board, and the support portion has a plurality of second apertures therethrough. The second apertures are in axial alignment with the first apertures. The lamp housing assembly has an airflow device positioned to move airflow over the heat sink and through the first and second apertures to carry heat away from the LED chip board during operation of the lamp assembly. The LED chip board and heat sink can be rotatable as a unit relative to the light fixture to adjust the angular position of the LED chip board while maintaining electrical engagement between the tip portion and the socket.

Another embodiment provides an LED-based lamp assembly for use with a light fixture having a socket portion. The lamp assembly includes a driver assembly having a base portion rotatably engageable with the socket portion to make a first electrical contact with the light fixture. The base portion is coupled to a driver housing and the driver assembly has an electrically conductive tip portion coupled to the base portion. The tip portion is engageable with the socket portion to make a second electrical contact with the light fixture wherein the tip portion and driver housing are moveable relative to each other when the tip portion is in the second electrical contact with the socket portion. The driver assembly includes first electrical contacts. The lamp assembly includes a lamp housing assembly operably connected to the driver assembly. The lamp housing assembly includes second electrical contacts operatively connected to the first electrical contacts of the driver assembly. The lamp housing assembly is coupled to at least one LED substrate having at least one LED light thereon. The LED substrate is connected to a heat sink configured to carry heat away from the LED substrate. The lamp assembly includes at least one fan electrically connected to the driver assembly and oriented to move air across the heat sink when activated.

Yet another embodiment provides an LED-based lamp assembly for use with a light fixture having a socket portion. The lamp assembly includes a driver assembly having a driver and a driver housing containing the driver. The lamp assembly further includes a base portion connected to the driver housing and electrically coupled to the driver assembly. The base portion includes an electrically conductive first threaded portion coupled to the driver assembly and rotatably engageable with the socket portion to make a first electrical contact with the light fixture. The base portion includes an electrically conductive tip portion electrically coupled to the driver assembly and electrically isolated from the first threaded portion. The tip portion is engageable with the socket portion to make a second electrical contact with the light fixture. The base and the driver assembly are moveable relative to each other when the tip portion is in the second electrical contact with the socket portion. The driver assembly includes first electrical contacts. The lamp assembly includes a lamp housing assembly operably connected to the driver assembly. The lamp housing assembly includes second electrical contacts operatively connected to the first electrical contacts of the driver assembly. The lamp housing assembly includes at least one LED substrate with at least one LED light thereon with the LED substrate being operatively coupled to the driver. The lamp assembly includes a heat sink connected to the lamp housing assembly and thermally coupled to the at least one LED substrate and configured to carry heat away from the LED substrate. The lamp assembly includes at least one fan electrically connected to the driver assembly and oriented to move air across the heat sink when activated.

DETAILED DESCRIPTION

The present disclosure describes Light Emitting Diode (LED)-based lamp assemblies in accordance with certain embodiments of the present invention. Several specific details of the invention are set forth in the following description and the Figures to provide a thorough understanding of certain embodiments of the invention. One skilled in the art, however, will understand that the present invention may have additional embodiments, and that other embodiments of the invention may be practiced without several of the specific features described below.

Figure 1:
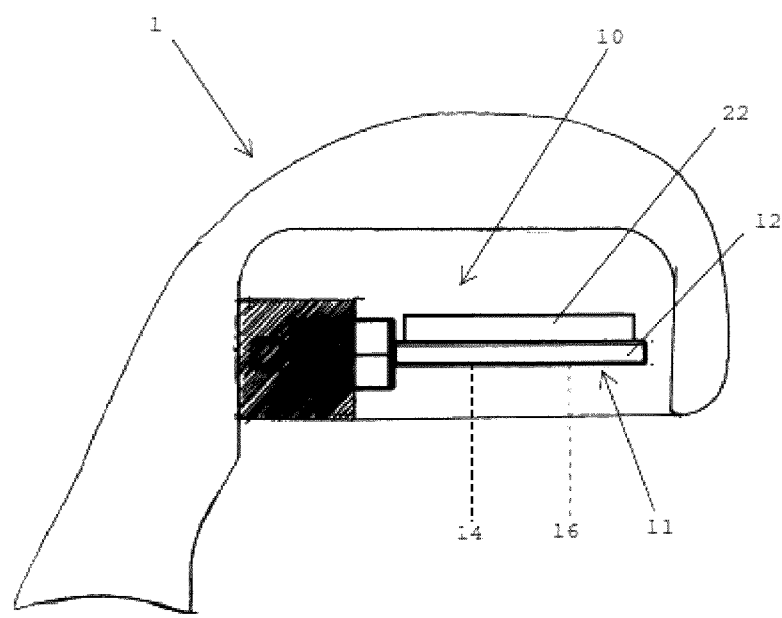
FIG. 1 is an isometric view of a light fixture with an LED-based lamp assembly in accordance with an embodiment of the present invention.
Figure 2:
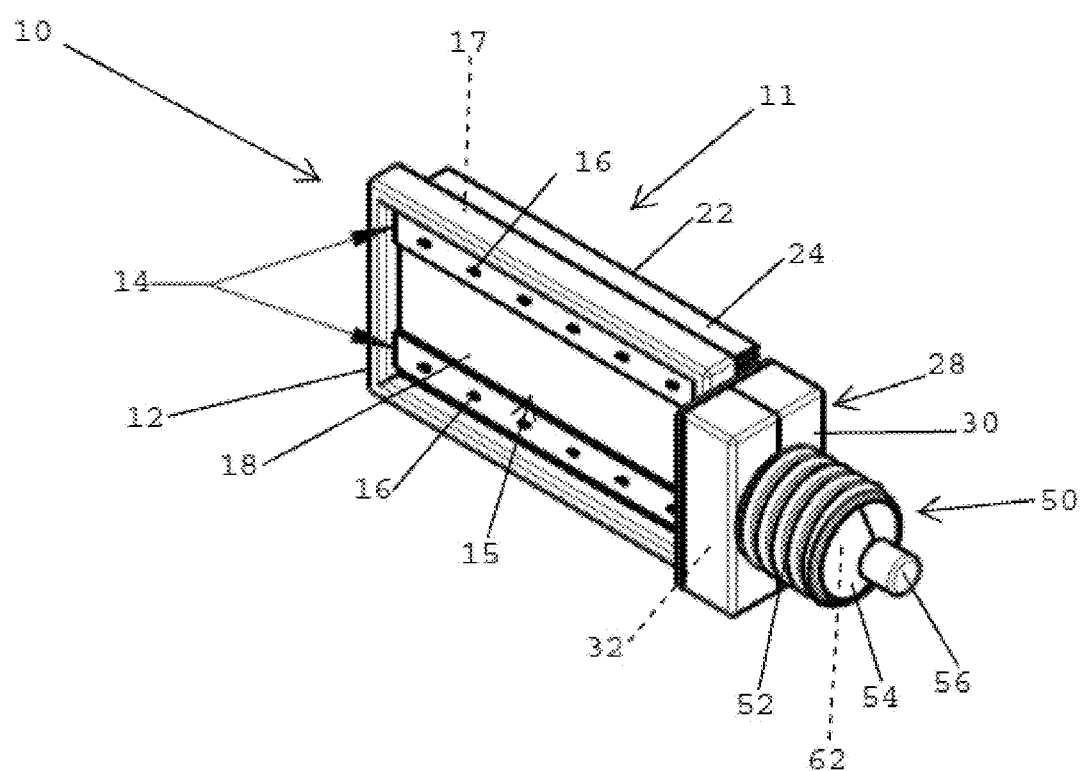
FIG. 2 is a bottom isometric view of an LED-based lamp assembly in accordance with an embodiment of the present invention.
Figure 3:
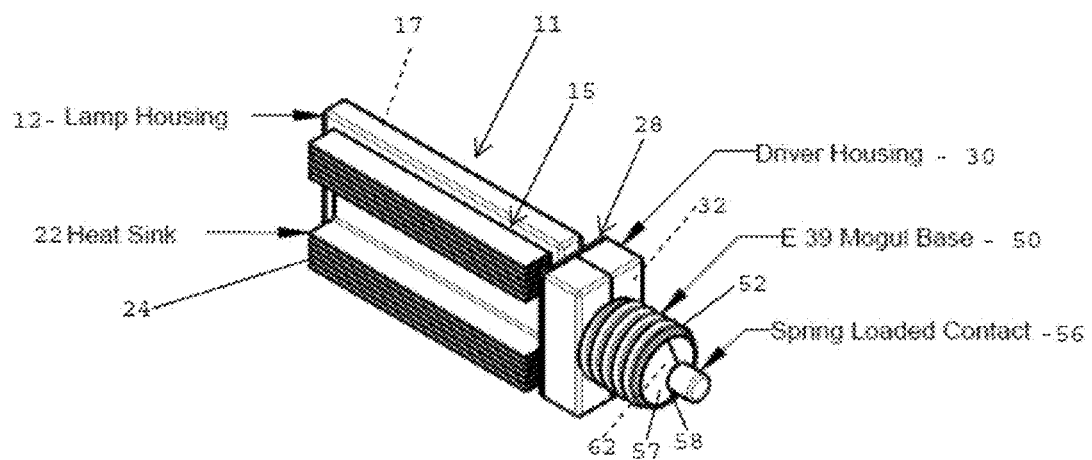
FIG. 3 is a top isometric view of the assembly of FIG. 2.

FIG. 1 is an isometric view of a light fixture 1 with an LED-based lamp assembly in accordance with an embodiment of the present invention. The light fixture is connected to an electricity source, such that the light fixture 1 provides electricity to the lamp assembly 10. As seen in FIGS. 2-7, the flat LED-based lamp assembly 10 of the illustrated embodiment has a lamp housing assembly 11 that includes a lamp housing 12, LED chip board(s) 14, LED lights 16, and a heat sink 22. The lamp housing 12 carries the heat sink 22, and one or more LED chip boards 14, which include one or more LED lights 16, are coupled to the heat sink 22. In the illustrated embodiment, the lamp housing 12 is a substantially flat, rectangular frame that defines an open interior area 15. The lamp housing 12 includes a shoulder portion 17 that extends radially inwardly toward the interior area 15 so as to define a support surface connected to the perimeter portion of the heat sink 22. The heat sink 22 is securely bonded or otherwise attached to the lamp housing 12 at the shoulder portion 17. Accordingly, a flat bottom surface 18 of the heat sink 22 extends across the lamp housing's open interior area 15.

In the illustrated embodiment, the LED chip boards 14, each of which includes a plurality of spaced apart LED lights 16, are attached to the flat bottom surface 18 of the heat sink 22 so that heat generated by the LED chip boards 14 and/or the LED lights 16, can be drawn away and dissipated by the heat sink 22. The LED chip board 14 in the illustrated embodiment is a conventional printed circuit board, although other embodiments can use other suitable structures that carry the LED lights 16, including, as an example, a SinkPAD™ product from SinkPAD Corporation of Placentia, Calif. In the illustrated embodiment, the LED chip board 14 spans across the lamp housing's interior area 15 and ends of the LED chip boards 14 are connected to the interior surface of the lamp housing 12. Alternately, the LED chip board may be an integral part of the heat sink member, with the LED lights being mounted directly onto the heat sink.

In the illustrated embodiment, two LED chip boards 14 are attached to the heat sink 22, although other embodiments can include one or more than two LED chip boards 14 operatively coupled to the heat sink 22, and each LED chip board 14 can have one or a plurality of LED lights 16 operatively disposed on the LED chip board. In at least one embodiment, the lamp housing 12 can be made of, as an example, a cast plastic, and the LED chip board(s) 14 with the LED lights 16 thereon can be adhered to a heat sink of aluminum, ceramic or other heat-dissipating material and then to the cast plastic. In other embodiments, other suitable materials can be used. In one embodiment, the LED chip boards 14 can be adhered directly to the back of the heat sink 22 using a thermally conductive adhesive, such as a high temperature thermally conductive epoxy. In addition, the entire lamp housing assembly 11 can be potted for exterior use. In yet another embodiment, the lamp housing assembly 11 can be coated with a thin film of sealant material that protects the components of the assembly without substantially decreasing heat transfer to and from the heat sink 22. For example, one embodiment can use a very thin Florine-based polymer film coating to help protect the features of the lamp housing assembly.

The LED chip boards 14 are mechanically and electrically connected to the lamp housing 12, such that electricity is provided to the LED lights 16 via the LED chip boards 14. The LED lights 16 and the LED chip boards 14 are positioned on the heat sink's planar bottom surface 18 in a selected orientation to provide the desired lighting characteristics from the lamp assembly 10. While the illustrated embodiment provides the LED chip boards 14 and LED lights 16 on the planar bottom surface 18, in other embodiments, the bottom surface 18 may have selected sloped or contoured surfaces so as to selectively orient or aim the LED lights 16 on the LED chip boards 14.

The heat sink 22 is configured to dissipate heat generated from the LED lights 16 and the LED chip boards 14. The heat sink 22 of the illustrated embodiment has a plurality of fins 24 extending away from the bottom surface 18 generally opposite each of the LED chip boards 14. Other embodiments can have heat sinks with other configurations of the fins or other heat dissipating elements. The heat sink 22 may be made of aluminum, aluminum alloy, ceramic, ceramic-based materials, or any other suitable heat-dissipating material. Further, the illustrated embodiment has a unitary heat sink 22 with integral heat dissipating elements, although other embodiments can include multiple heat sinks or other arrangements of head dissipating elements positioned in selected locations relative to the LED chip board(s) 14 to carry heat away from the LED chip board(s) 14 and LED lights 16 during operation.

The lamp housing assembly 11 is removeabley connected to a driver assembly 28, such that when the lamp housing assembly 11 is in an installed position on the driver assembly 28, the lamp housing assembly 11 is mechanically and electrically connected to the driver assembly, as discussed in greater detail below. The driver assembly 28 of the illustrated embodiment has a driver housing 30 that contains and/or supports a constant current device 32, such as an LED driver integrated circuit (IC) or the like. The constant current device 32 is operatively coupled to the LED chip board 14 and LED lights 16 via an interlocking member 26 on the lamp housing (discussed below). The constant current device 32 is configured to allow the flat LED lamp assembly to be used in any current ballast type fixture or voltage input level from, for example, 85 v to 480 v. In one embodiment, the driver housing 30 may be cast from plastic or other suitable material and may include two or more cavities that will be potted for exterior and wet location uses and appropriately sealed with glue, sonic welding of the housing structures or other suitable protective closure.

As indicated above, the flat LED lamp assembly 10 is configured to as a replacement or retrofit light element for existing light fixtures, such as HID bulbs with a threaded mogul base. The conventional HID light fixtures typically have ballasts or other configurations that provide a high voltage start-up surge that is needed to "ignite" or otherwise energized the HID bulb. The driver assembly 28 of the present flat LED lamp assembly 10 is provided with the constant current device 32 that is configured to automatically discharge any high voltage start-up surge produced by the HID ballast in the HID light fixture. Accordingly, the lamp assembly 10 can be screwed into a mogul base socket of a conventional HID light fixture, and the constant current device 32 accommodates the HID ballasts without having to retrofit or rewire the light fixture 1 (FIG. 1). Although the illustrated embodiment is discussed as having a threaded mogul base for use in a light fixture having a mogul socket, it is to be understood that the lamp assembly in accordance with the present disclosure can include a medium base or a threaded base having a different size (including a standard size as well as custom sizes) for use with a light fixture having a corresponding sized socket.

In one embodiment, the constant current device 32 is configured with input power conditioning that allows the lamp to be used with existing supply voltage and ballast infrastructure, dissipating ignition pulses from the ballast and providing conditioned power to the constant-current driver circuitry. Conditioned power supplied to the driver circuitry may be either AC or DC as required. Voltage rectification, power factor correction, and dissipation of ignition pulses may each or all be done with either passive or active components. As an example of passive components, a simple clamping diode may be used to dissipate the ignition pulses.

Figure 4:
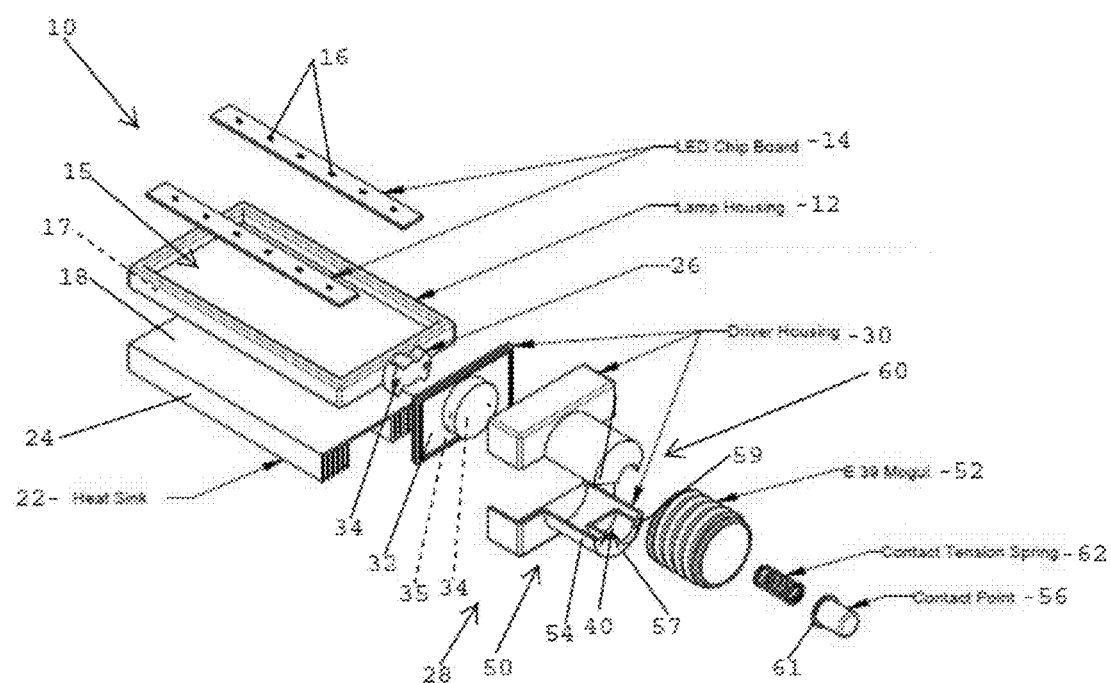
FIG. 4 is a partially exploded bottom isometric view of the assembly of FIG. 2.

As seen in FIG. 4, lamp housing assembly 11 has an interlocking member 26 connected to the lamp housing 12, and the interlocking member included a pair of electrical contacts 34 electrically coupled to the LED chip board 14 and the LED lights 16. The interlocking member 26 is configured to releasably connect to a receiving portion 40 of the driver housing 30 to provide an electrical connection between the components.

Figure 5A:
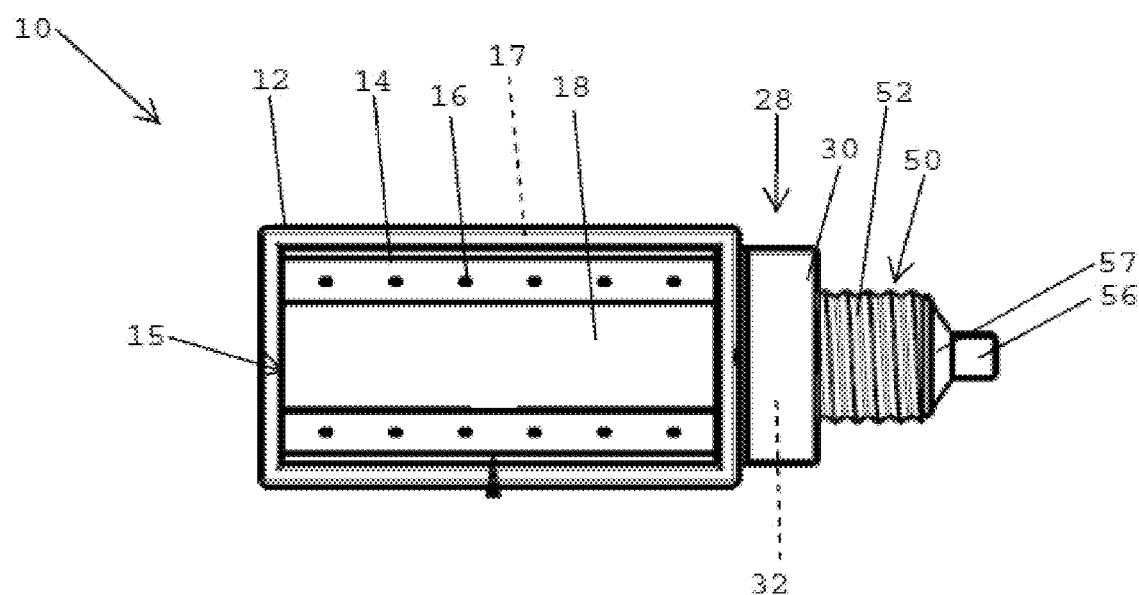
FIGS. 5A-5E include a bottom plan view, a top plan view, a side elevation view, a front elevation view and a rear elevation view of the assembly of FIG. 2.
Figure 5B:
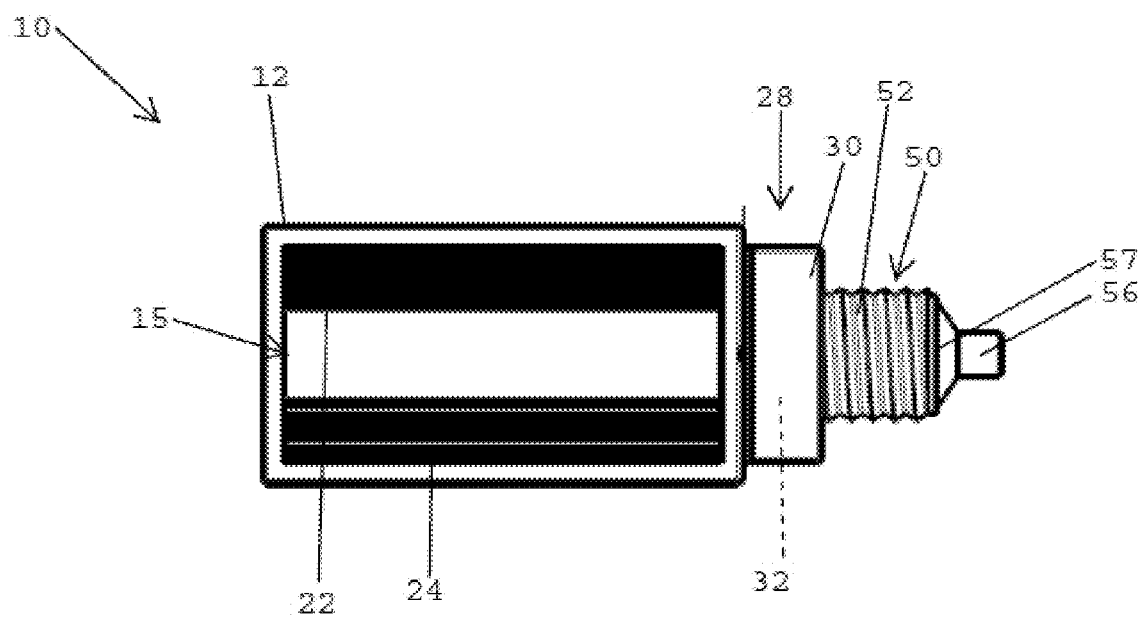
Figure 5C:
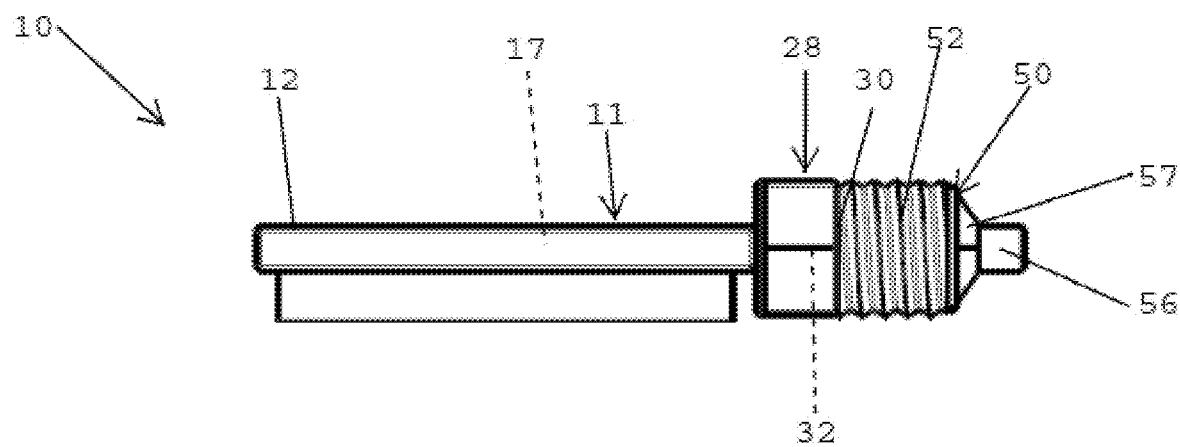
Figure 5D:
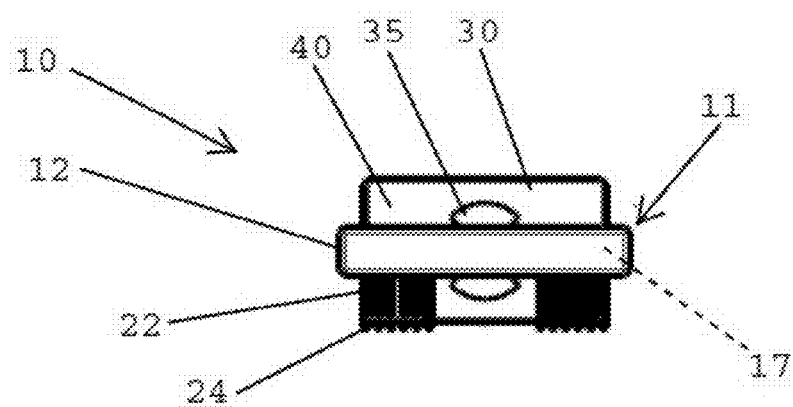
Figure 5E:
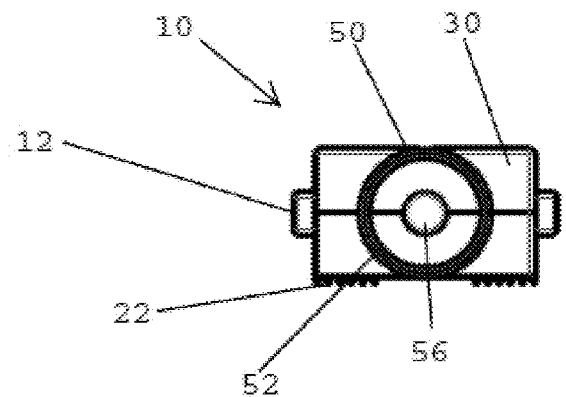
Figure 6:
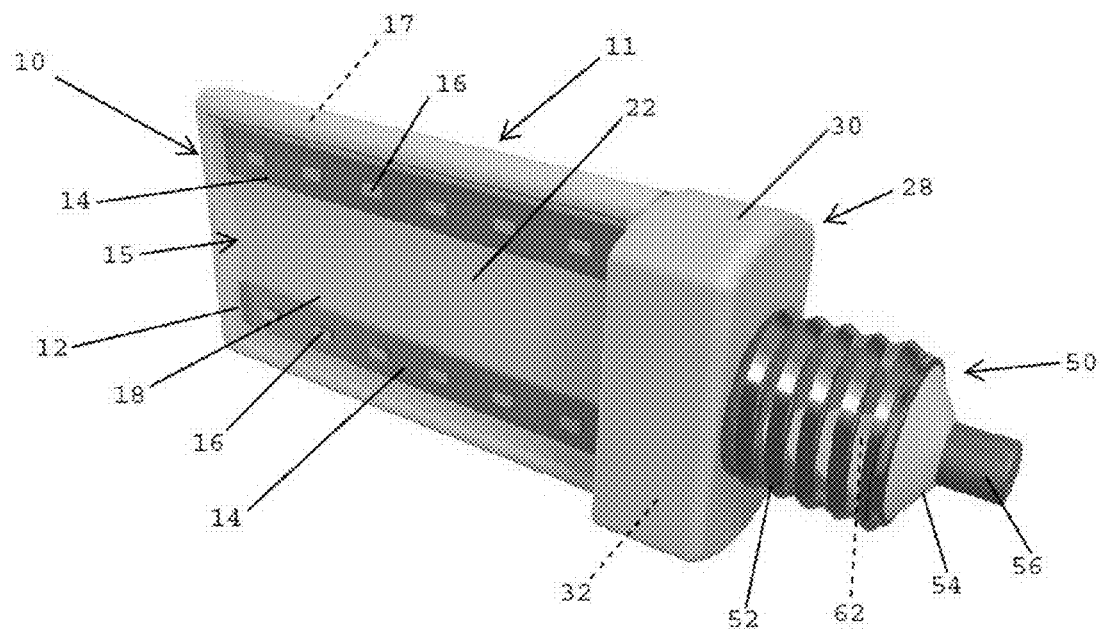
FIG. 6 is another bottom isometric view of the LED-based lamp assembly of FIG. 2.
Figure 7:
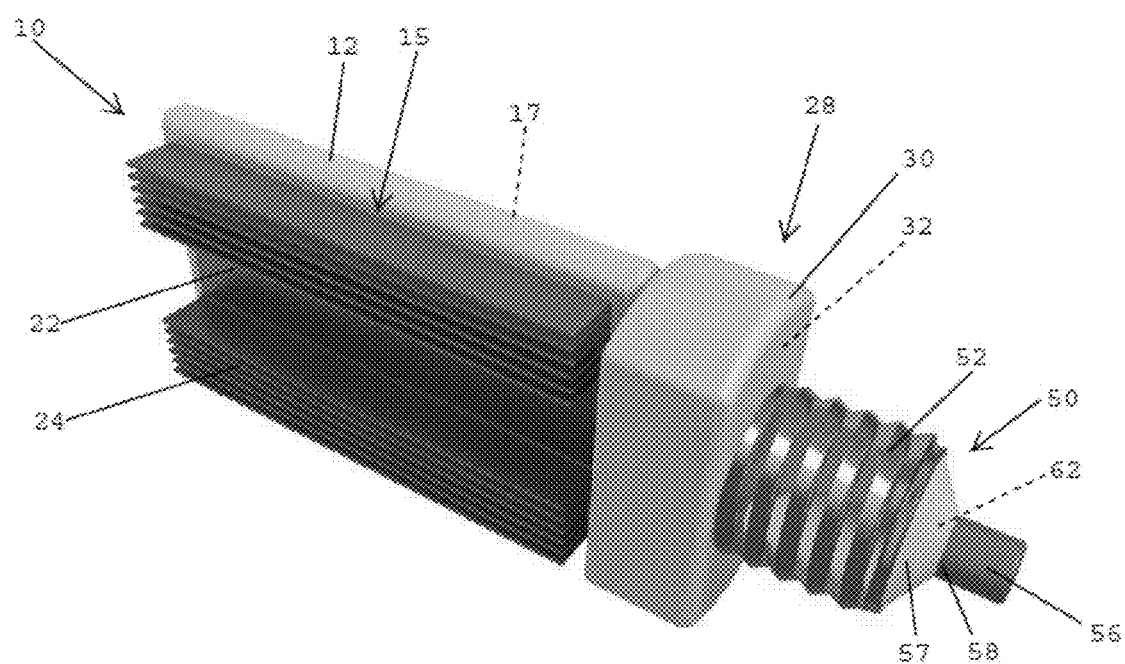
FIG. 7 is a top isometric view of the assembly of FIG. 6.

In the illustrated embodiment, the interlocking member 26 project rearwardly from a rear wall of the lamp housing 12, and the interlocking member has a "bow-tie" shape with a pair of electrical contacts 34 on the rear surface of the member. These electrical contacts 34 are electrically connected to the LED chip boards 14 and the LED lights 16. This bow-tie shaped interlocking member 26 fits into a similarly shaped aperture 35 in a receiving portion 40 of the driver housing (FIG. 5D). In the illustrated embodiment, when the lamp housing assembly is in the installed position, the bow-tie shaped interlocking member 26 is oriented at an approximately 90-degree offset from the aperture 35 in the driver housing's receiving portion 40. Accordingly, the interlocking member 26 can fit into the aperture 35 when the lamp housing assembly is rotated 90-degrees from the installed position.

In one example, the flat lamp housing assembly 11 is substantially horizontal when in the installed position. The lamp housing assembly 11 can be removeably connected to the driver housing assembly 28 by orienting the lamp housing assembly 11 vertically, so the bow-tie shaped interlocking member 26 is aligned with the bow-tie shaped aperture 35 in the driver housing's receiving portion 40. The interlocking member 26 is positioned in the driver housing 30 through the aperture 35, and the lamp housing assembly 11 is then rotated 90-degrees relative to the driver housing 30 so that the interlocking member is 90-degrees misaligned with the aperture 35. Accordingly, the interlocking member 26 is releasably locked to the driver housing 30 when in the installed position, but can be quickly disconnected upon rotating the lamp housing assembly 90-degrees relative to the driver housing 30.

Figure 8:
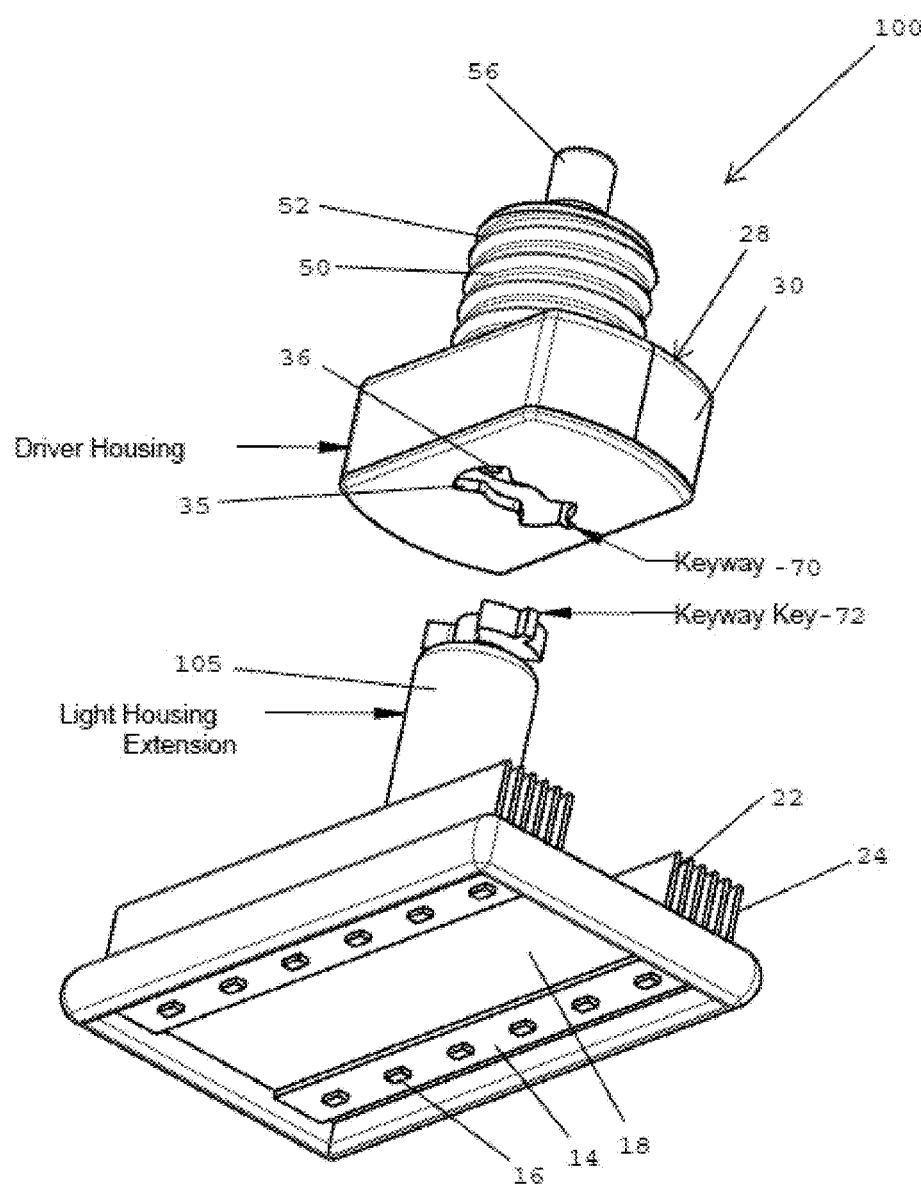
FIG. 8 is an isometric view of an LED-based lamp assembly in accordance with another embodiment.
Figure 9:
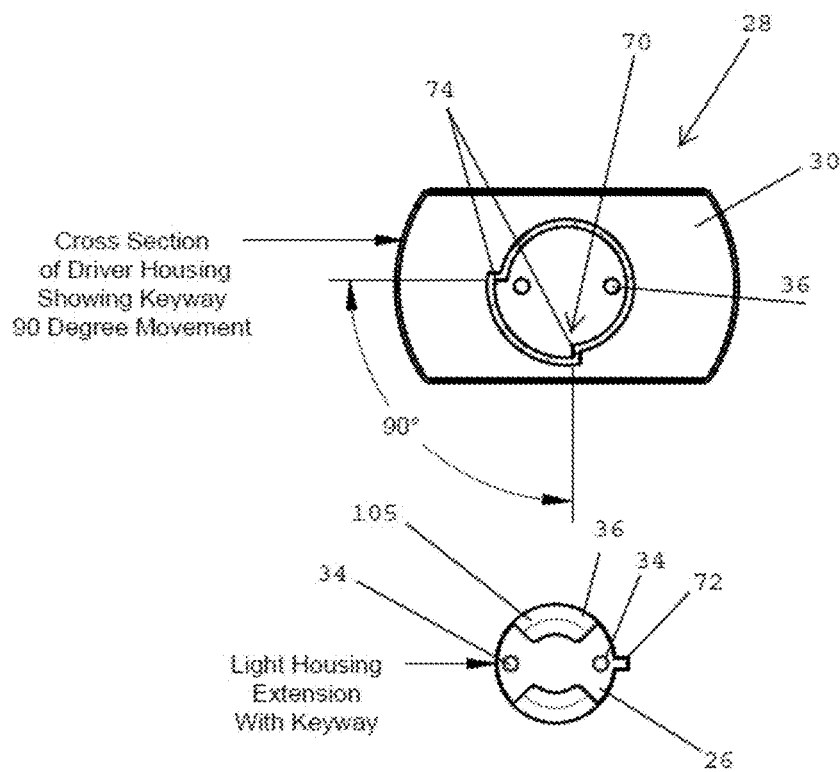
FIG. 9 is an elevation view of portions of the driver assembly and light housing assembly of FIG. 8.
Figure 10:
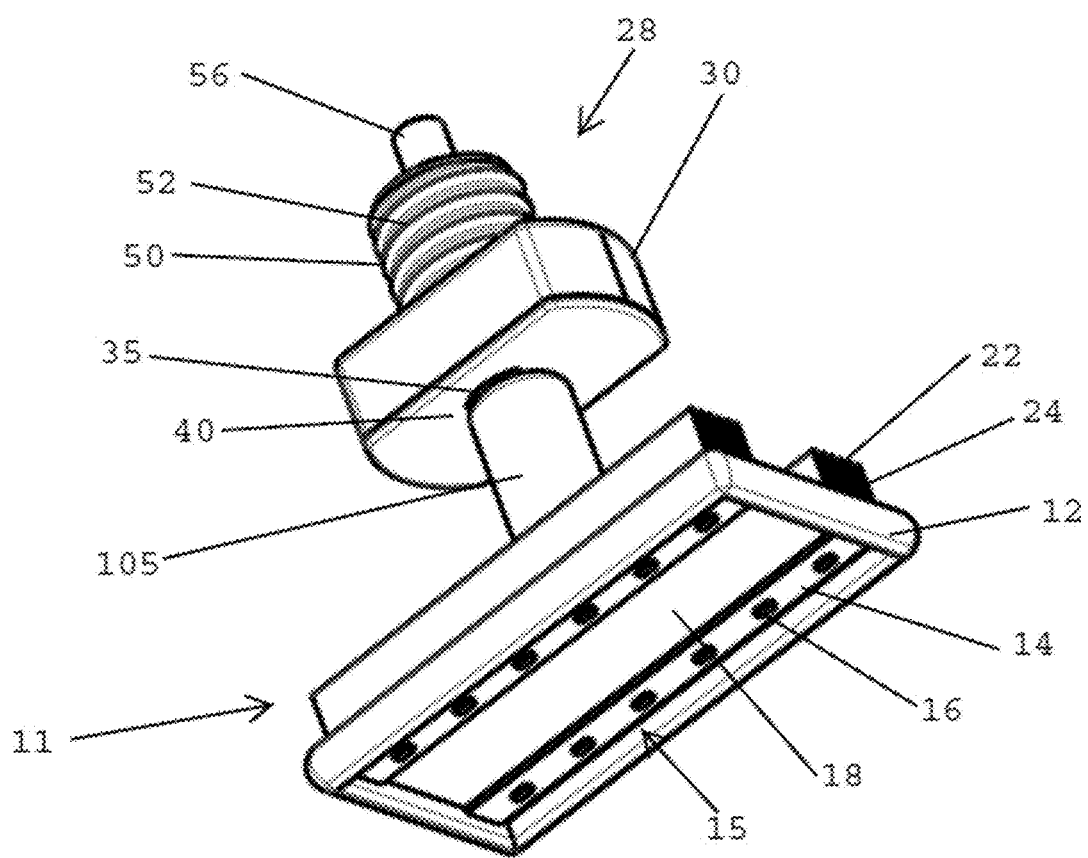
FIGS. 10 and 11 are bottom and top isometric views of an LED-based lamp assembly in accordance with another embodiment.
Figure 11:
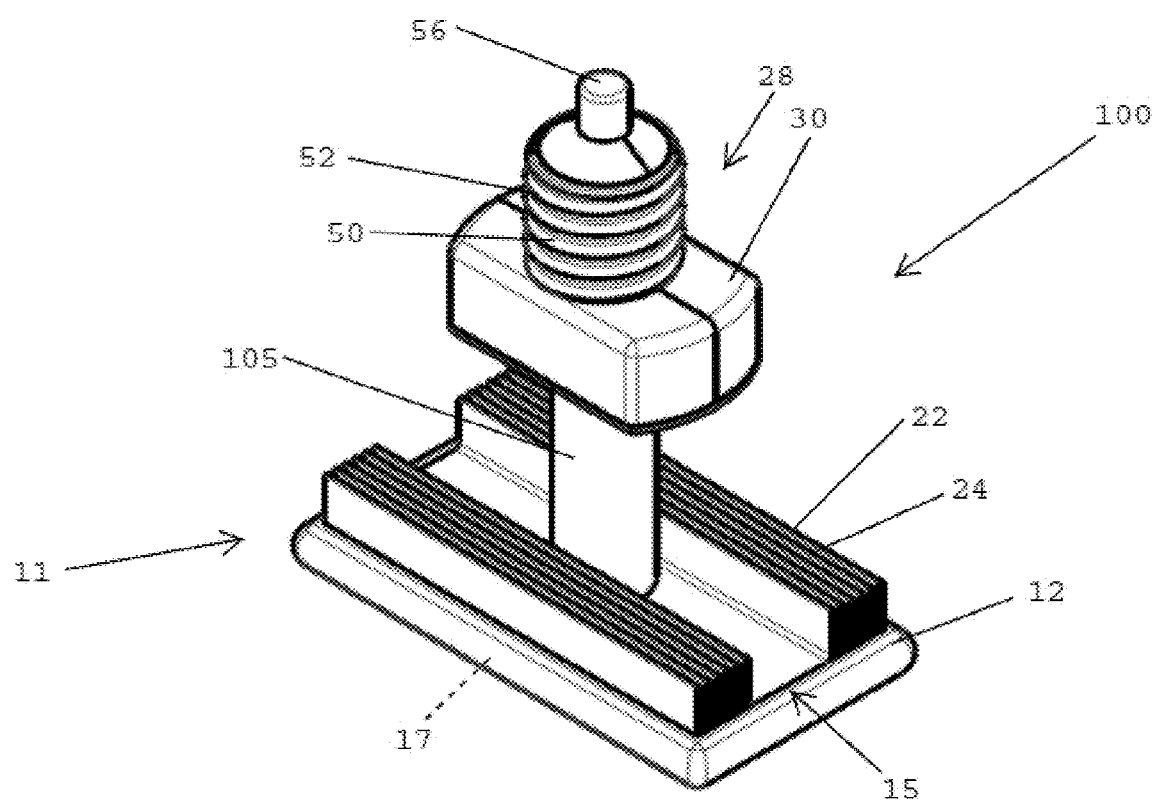
Figure 12A:
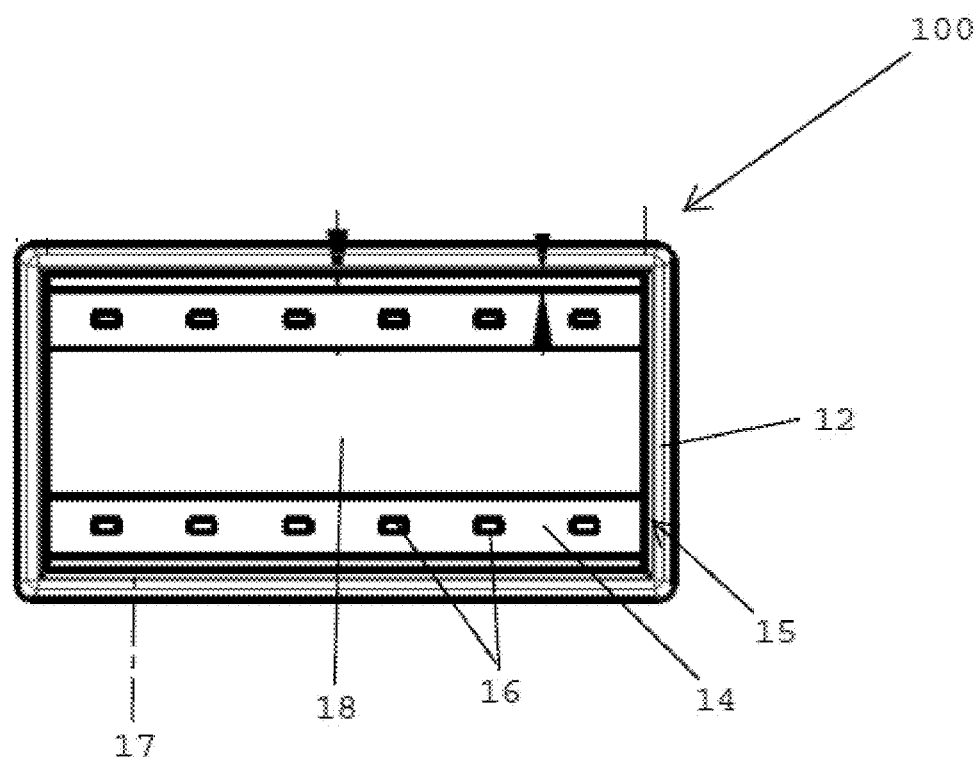
FIGS. 12A-12D include a bottom plan view, a top plan view, a side elevation view, and a front elevation view of the assembly of FIG. 10.
Figure 12B:
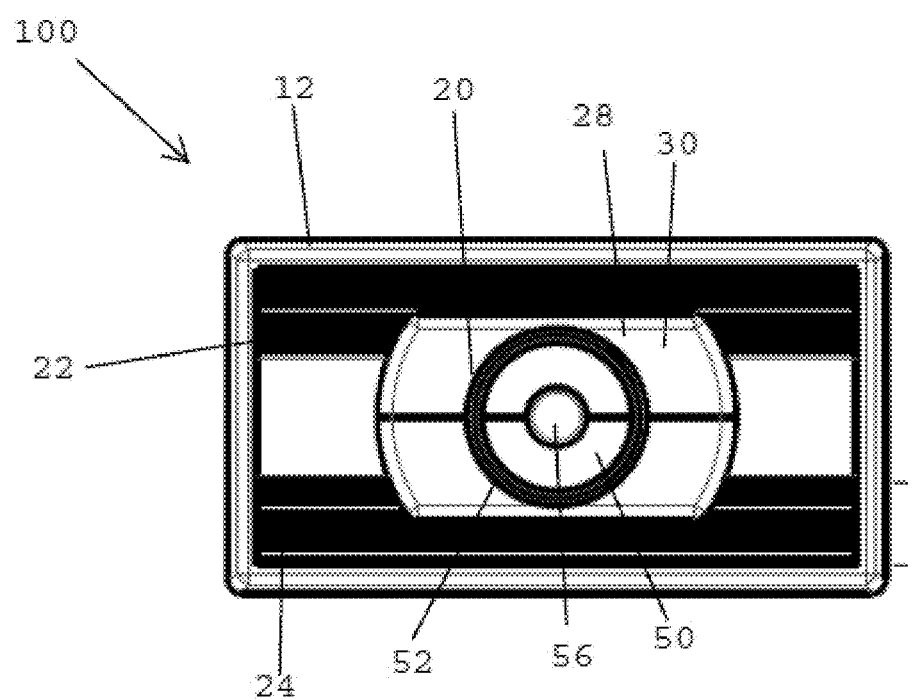
Figure 12C:
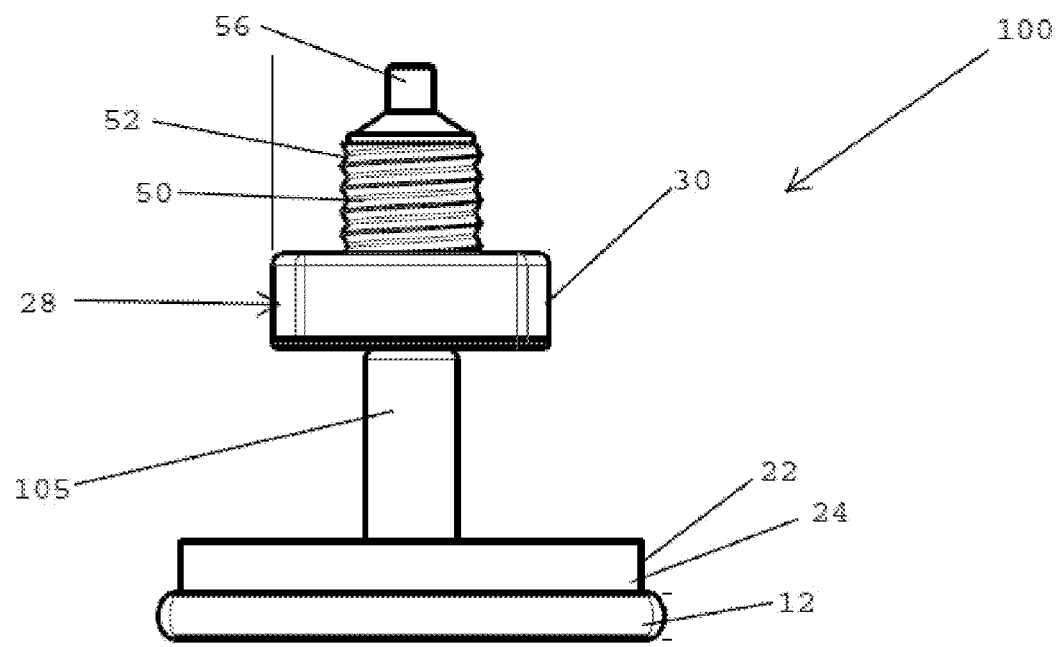
Figure 12D:
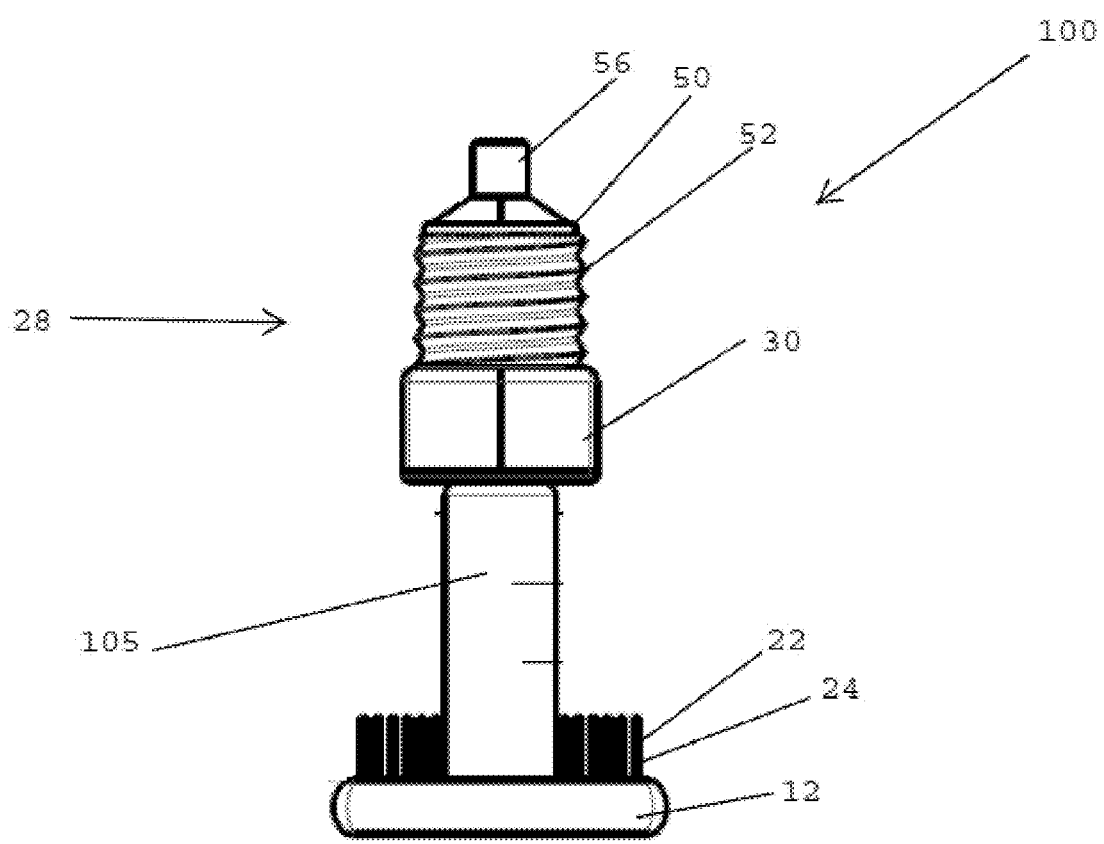
Figure 13:
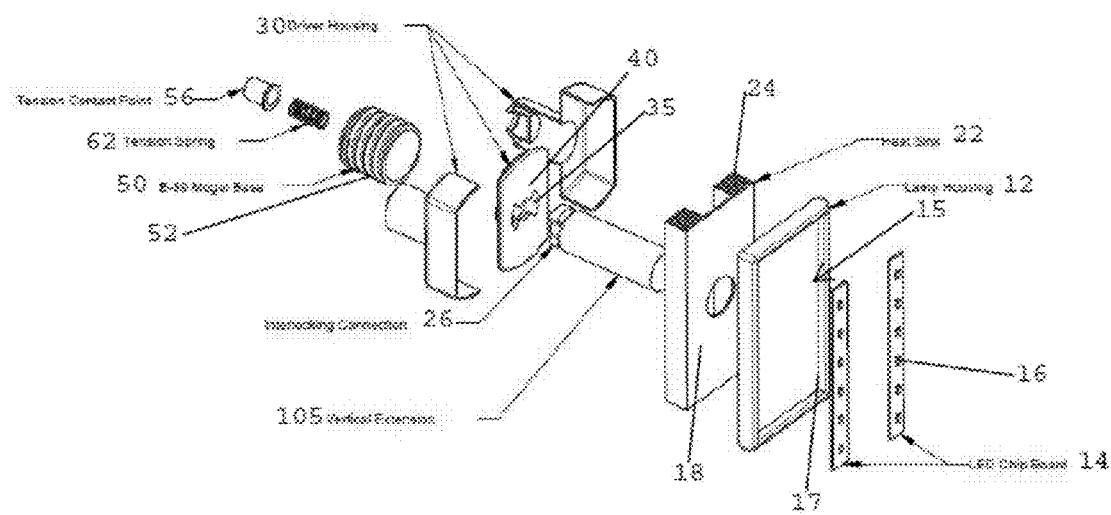
FIG. 13 is a partially exploded isometric view of the LED-based lamp assembly of FIG. 10.
Figure 14:
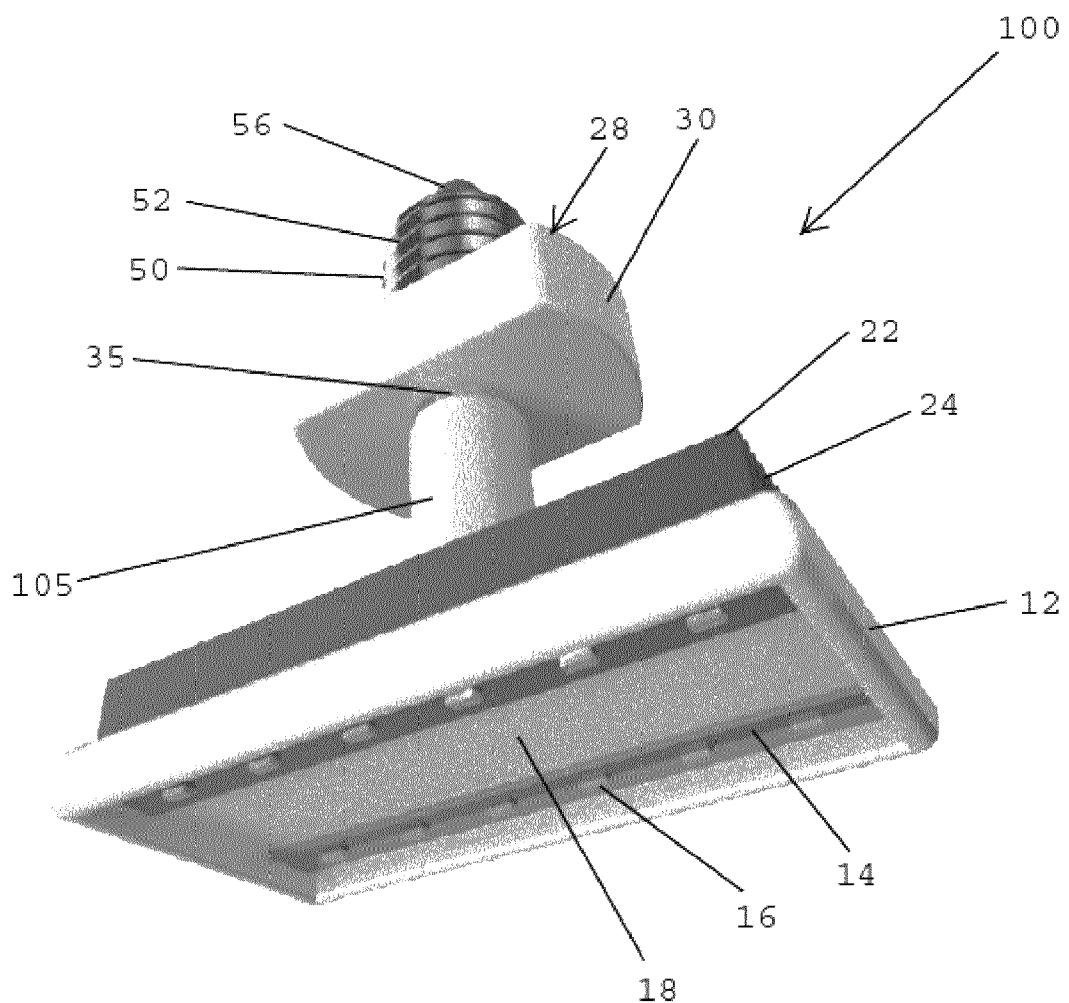
FIGS. 14 and 15 are other bottom and top isometric views of the LED-based lamp assembly of FIG. 10.
Figure 15:
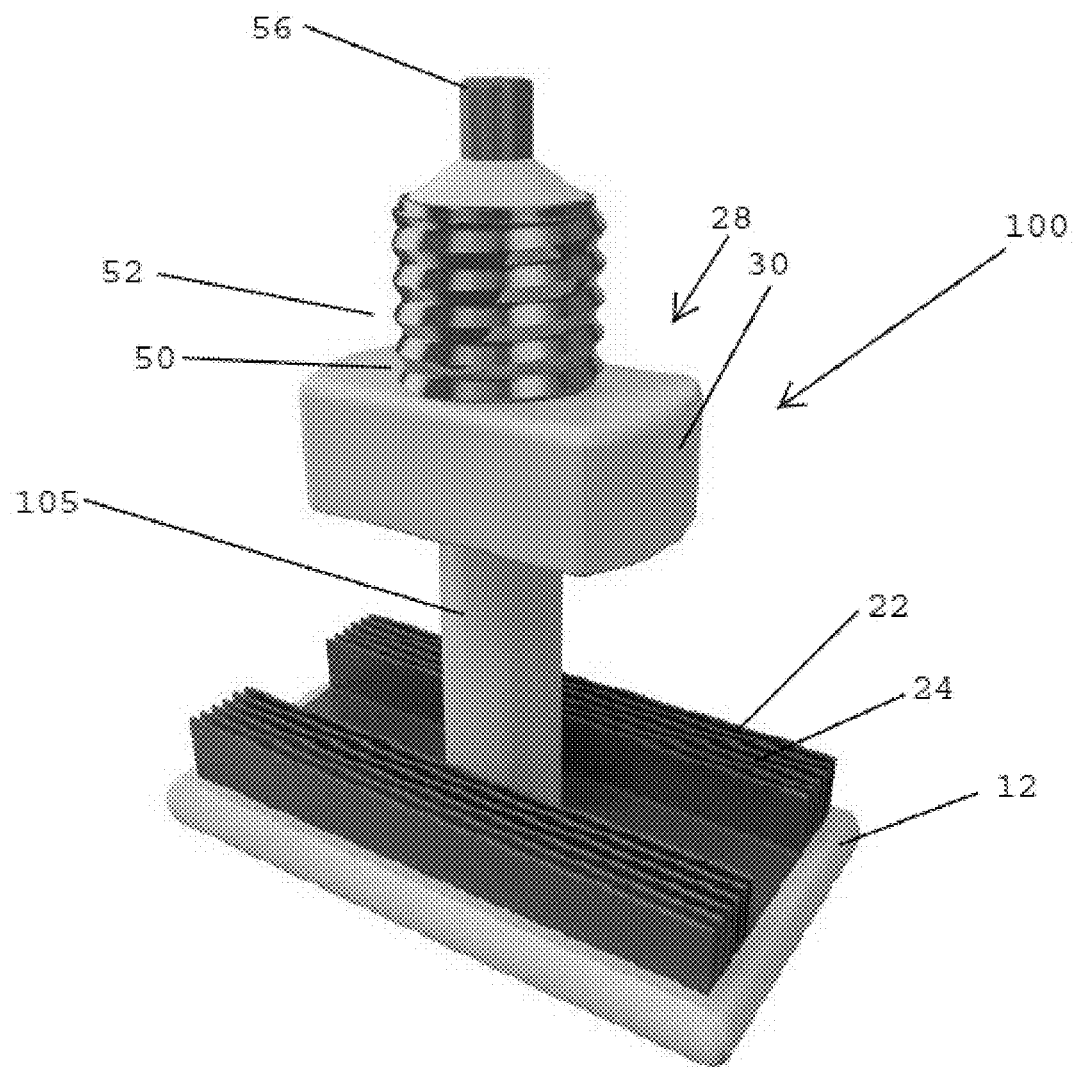

In one embodiment illustrated in FIGS. 8 and 9, the lamp housing assembly 11 and the driver housing 30 are configured so the interlocking member 26 will only fit into the aperture 35 when the lamp housing assembly 11 is in a particular orientation relative to the driver housing. In the illustrated embodiment, the aperture 35 in the forward wall of the driver housing 30 has a keyway 70 on one side of the aperture 35. The interlocking member 26 has a similarly shaped key member 72 on one end of the member. This keyway 70 and key 72 configuration requires the lamp housing assembly 11 be oriented so the key 72 will pass through the keyway 70 as the lamp housing assembly is being connected to the driver housing, thereby insuring proper positioning of the lamp housing assembly 11.

After the interlocking member 26 is inserted into the aperture 35, the lamp housing is rotated 90-degrees in one direction (i.e., clockwise) to lock the lamp housing assembly in the installed position. In the embodiment shown in FIG. 9, the keyway 70 in the driver housing 30 is configured with rotational stops 74 that restrict the direction and extent of rotation of the interlocking member 26 within the driver housing. In the illustrated embodiment, the keyway 70 is configured with rotation stops 74 that allow the interlocking member 26 to rotate only in the clockwise direction and through a range of approximately 90-degrees when the interlocking member is first inserted into the aperture 35 for movement toward the installed position. The keyway 70, the key 72, and the rotation stops 74 are positioned to insure that the lamp housing assembly 11 properly and operatively connects to the driver assembly 28. This arrangement also insures that proper electrical connection between the components is established, so as to avoid inverting the connections and creating a reverse polarity situation between the components. When the lamp housing assembly 11 is operatively connected to the driver assembly 28 and in the installed position, the entire LED-based lamp assembly 10 will rotate clockwise to screw into and mate with the internal threads of a conventional mogul base socket. The engagement between the lamp housing assembly 11 and the driver assembly is sufficiently secure so that the entire LED-based lamp assembly 10 can be rotated counterclockwise as a unit to unscrew the assembly from the conventional mogul base socket without rotating the lamp housing assembly away from the installed position.

As indicated above, the interlocking member 26 has the electrical contacts 34 on its rear face, and the electrical contacts 34 are configured to engage mating electrical contacts 36 in the receiving portion 40 of the driver housing 30 when the lamp housing assembly 11 is in the installed position. As best seen in FIG. 9, the electrical contacts 36 are positioned in the driver housing 30 relative to the aperture 35, so that when the lamp housing's interlocking member 26 is in an installed position in the receiving portion, the electrical contacts 34 and 36 are electrically connected to each other. When the lamp housing assembly 11 is rotated away from the installed position, the interconnect member 26 and its electrical contacts 34 move out of engagement with the driver housing's electrical contacts 36, and terminate the electrical connection between the driver assembly 28 and the LED chip boards 14 and the LED lights 16. This arrangement of the bow-tie shaped interconnect member 26 and the driver assembly's housing 30 provides the quick connect/disconnect arrangement between the components while insuring that proper alignment and electrical connection will be established when in the installed position. Other embodiments may have other configurations to provide the quick connect/disconnect interface between the components.

This quick disconnect feature allows an entire lamp housing assembly 11 (with the lamp housing 12, LED chip boards 14, the LED lights 16, and the heat sink 22) to be disconnected from the driver assembly 28 while the driver assembly 28 remains in place in the light fixture. Accordingly, a user can remove and replace one lamp housing assembly 11 and install a new lamp housing assembly without having to remove or change the driver assembly 28 in the light fixture 1. Changing of the lamp housing assembly 11 can be done if, as an example, LED lights need to be replaced, or if different lumens or luminous lux is desired. The quick disconnect also allows one style of lamp housing assembly 11, such as a horizontal assembly, to be easily and quickly replaced with another style of lamp housing assembly, such as a T-device usable for High Bay or vertical facing light fixtures. When the lamp housing assembly 11 is fully engaged, it is securely "locked" in place in the driver assembly 28 and the electrical contacts between the components will be fully engaged and energized.

The lamp assembly 10 of the illustrated embodiment has the base 50 connected to the driver housing 30. In the illustrated embodiment, the base 50 is a threaded mogul base configured to screw into and mate with the internal threads of a conventional mogul base socket 51 of the light fixture 1 (FIG. 1). While the lamp assembly 10 of the illustrated embodiment is described as having a mogul base, other embodiments of the lamp assembly can include a medium base, or other base configurations that can be used with conventional or custom light fixtures without having to rewire, rework, or retrofit the light fixture.

In the illustrated embodiment, the base 50 has a metal, substantially cylindrical threaded sleeve 52 fixedly attached to a mating portion 54 of the driver housing 28. The sleeve 52 is configured to operatively connect to an electrical contact in the socket 51 so as to establish one of the electrical contact points between the light assembly 10 and the light fixture 1. The base 50 also includes a biased, electrically conductive, retractable tip 56 that defines the second electrical contact point with another electrically conductive portion in the socket 51. The retractable tip 56 is slidably disposed in a receptacle 58 in an electrically insulated separator 57 the distal portion 60 of the driver housing 28. Accordingly, the insulated separator 57 is disposed between the retractable tip 56 and the outer metal threaded sleeve 52. The metal mogul threaded sleeve 52 can be cast into porcelain that forms part of the driver housing 30. The retractable tip 56 is slidably retained in the distal portion of the driver housing 30 by a radially extending flange 61 on the proximal end of the tip that overlaps with a slight rim or flange 59 formed in the housing at the entrance to the receptacle 58. In other embodiments, other retention configurations between the tip 56 and the driver housing 30 can be used.

An electrically conductive, contact tension spring 62 is positioned in the receptacle 58 and biases the retractable tip 56 toward an extended position away from the driver housing 28. The spring 62 and the retractable tip 56 are electrically coupled to the constant current drive 32, such that when the mogul base 50 is screwed into the mogul base socket of the fixture, the retractable tip 56 makes electrical contact with the fixture 1 (FIG. 1).

The retractable tip 56 compresses the spring 62 and moves axially into the receptacle 58 as the base 50 is screwed further into the socket after the tip 56 makes initial contact with the fixture's socket. The spring 62 biases the tip 56 against the electrical contact in the fixture's socket. The spring 62 also acts as a tensioner to keep the male threads of the sleeve 52 in firm engagement with the threads of the fixture's socket, thereby providing improved frictional engagement between the lamp assembly 10 and the fixture. While the illustrated embodiment uses a spring 62, such as an electrically conductive contact tension spring, other embodiments can use other springs or other biasing members to urge the tip 56 away from the distal end of the driver housing 30 and to enhance the frictional retention of the lamp assembly 10 in the light fixture 1 (FIG. 1).

This retractability of the tip 56 also ensures that the flat lamp can rotate to a desired or proper orientation within the fixture after electrical contact has been made between the retractable tip and the end of the socket in the light fixture. In the illustrated embodiment, the retractable tip 56 and the spring 62 are configured to retract so that the lamp assembly 10 can be rotated up to one full turn (360°) relative to the light fixture after the retractable tip 56 makes initial electrical contact with the bottom of the fixture's socket. During this additional rotation, the mogul base 50 screws further into the socket and the tip 56 is retracted and the spring 62 is compressed. Accordingly, the lamp assembly 10 can be screwed into the light fixture 1 (FIG. 1), and after electrical connection is initially established, the lamp assembly 10 can be further rotated within the light fixture until the lamp housing assembly 11 is properly oriented within the light fixture no matter which point the male threads on the mogul engage with the female receiver threads.

FIG. 10-15 are isometric and elevation views of an LED-based lamp assembly 100 in accordance with another embodiment. In this alternate embodiment, lamp assembly 100 is generally similar to the lamp assembly 10 discussed above, except for the primary features described below. The lamp housing assembly 11 of the illustrated embodiment defines a flat assembly that is substantially perpendicular to the longitudinal axis of the driver assembly 28. The lamp housing assembly 11 has a spacer 105 coupled to the heat sink 22 on the top of the lamp housing 12. The spacer 105 can be connected directly to the heat sink 22, or the spacer can extend through an aperture in the heat sink and attach directly to the lamp housing 12.

The other end of the spacer 105 away from the lamp housing 12 includes an interlocking contact member 26 that releasably connects to the driver housing 30 in a quick connect/disconnect fashion as described above. In one embodiment, the interlocking contact member 26 has the same bow-tie shape as in the embodiment discussed above, such that the end of the spacer can releasably connect with the driver assembly 28 of the embodiment discussed above. In another embodiment, an articulateable portion can be provided at or near the distal end of the spacer 105 that would allow the lamp housing 12 to rotate from a perpendicular position relative to the spacer to angled positions through in substantially any number of infinite degrees to a fully parallel position relative to the spacer 105 in some HID light fixture housings. Accordingly, the driver assembly and the lamp housing assembly of the embodiments of FIGS. 2-7, FIGS. 8-10, and FIGS. 11-16 can be interchangeable.

Figure 16:
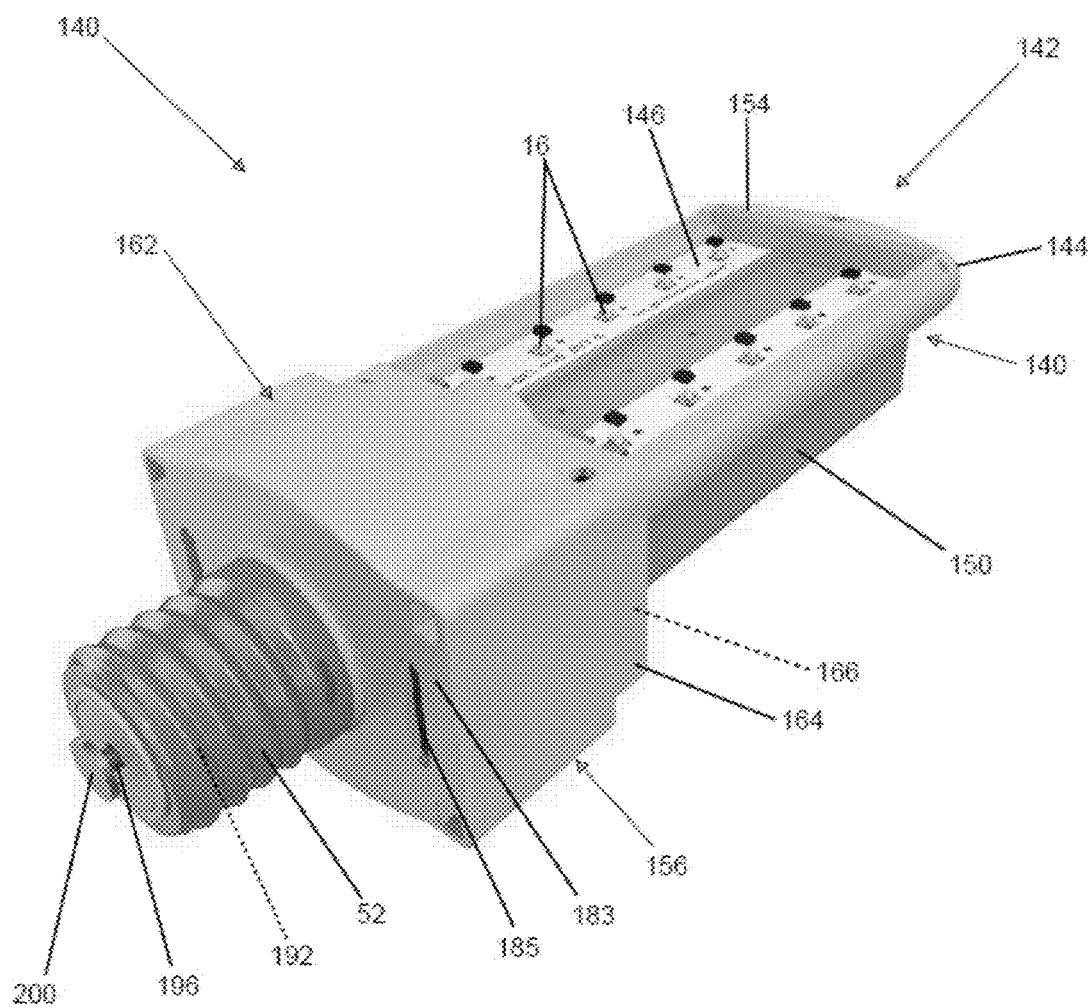
FIG. 16 is a rear bottom isometric view of an LED-based lamp assembly in accordance with another embodiment.
Figure 17:
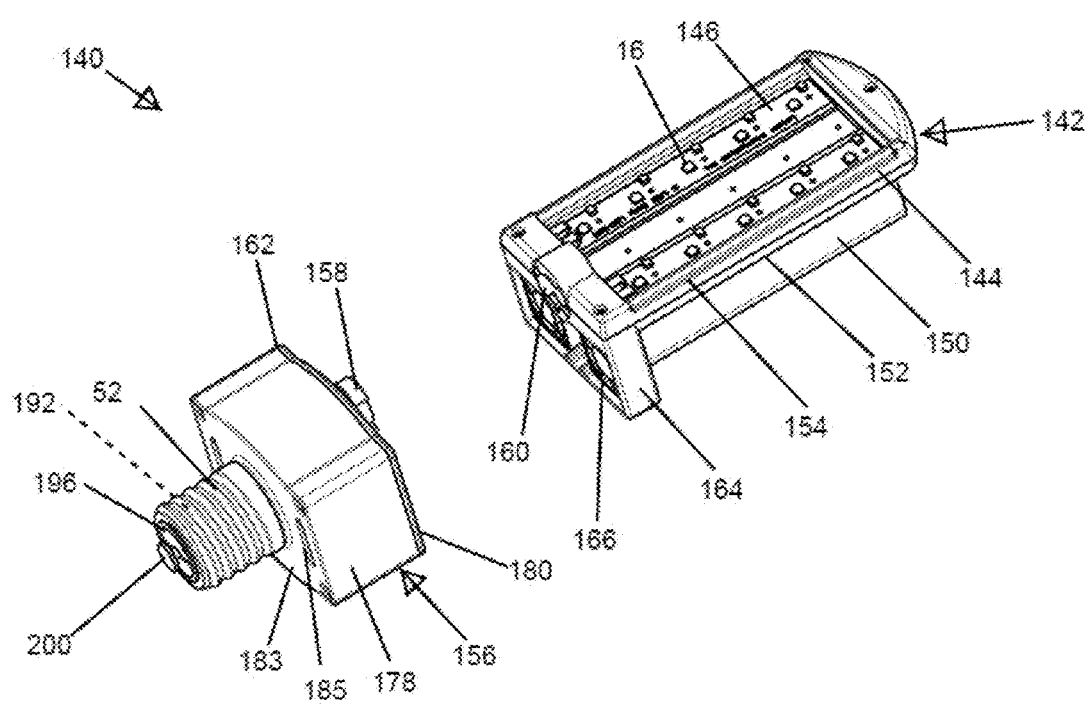
FIG. 17 is a partially exploded bottom isometric view of the lamp assembly of FIG. 16.
Figure 18:
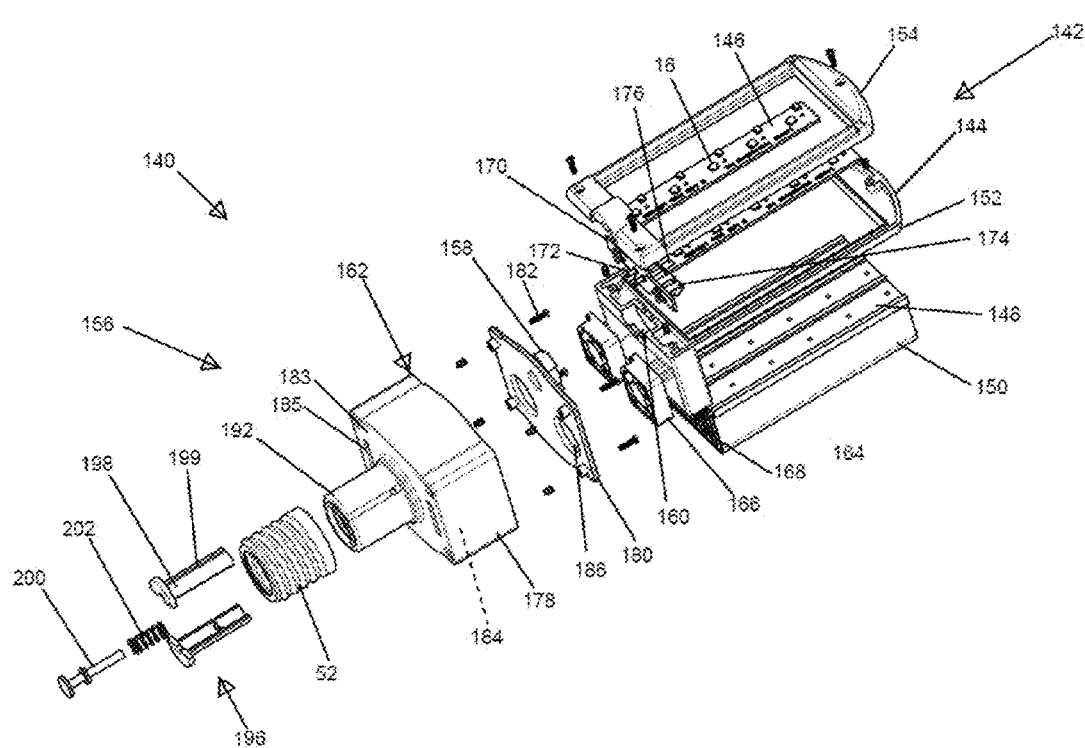
FIG. 18 is an exploded rear isometric view of the lamp assembly of FIG. 17.

FIG. 16 is a rear bottom isometric view of an LED-based lamp assembly 140 in accordance with another embodiment, and FIGS. 17 and 18 are exploded bottom isometric views of the lamp assembly 140. The lamp assembly 140 has a lamp housing assembly 142 with a lamp housing 144 and LED chip boards 146 attached to a flat bottom surface 148 (FIG. 18) of a heat sink 150. The lamp housing assembly 142 is removeably connected to a driver assembly 156, discussed in greater detail below.

The lamp housing assembly 142 and driver assembly 156 are generally similar to the lamp housing assembly 11 and driver assembly 28, respectively, discussed above, except for the primary differences discussed below. As best seen in FIGS. 17 and 18, the lamp housing assembly 142 has top and bottom frame portions 152 and 154 that connect to the heat sink 150 and the LED chip boards 146. The lamp housing assembly 142 releasably connects to the driver assembly 156 with a male interlocking member 158 that mates with a shaped female aperture 160, similar to the interlocking member 26 and shaped aperture 35 discussed above. In the illustrated embodiment, the shaped female aperture 160, however, is formed in the top and bottom frames 152 and 154 of the lamp housing assembly 142, and the shaped male interlocking member 158 is projecting from the driver housing 162 of the driver assembly 156. While the shaped female aperture 160 is formed by the top and bottom frame portions 152 and 154, other embodiments can provide the aperture in only one of the top or bottom frame portions.

In the illustrated embodiment, the top frame portion 152 has a rear fan housing portion 164 that projects away from the bottom frame portion 154 and is positioned adjacent to the back end of the heat sink 150. The rear fan housing portion 164 is a partially hollow structure that contains a pair of fans 166 adjacent to the back end of the heat sink 150. The fans 166, when activated, are positioned to blow a flow of air directly into and through the heat sink 150 to facilitate heat removal from the fins 168 of the heat sink 150 during operation of the lamp assembly 140. In the illustrated embodiment, the fans 166 can be highly efficient, electric, sealed, dust resistant fans, such as fans provided by Sunon® (i.e., Sunonwealth Electric Machine Industry Company, Ltd). Other embodiments can use fans from other manufacturers. While the illustrated embodiment uses two fans 166 carried by the top frame portion 152, other embodiments may use one fan or more than two fans depending upon, as an example, the thermal characteristics of the lamp assembly 140.

The fans 166 are electrically connected to an interface board 170 positioned in the lamp housing adjacent to the rear fan housing portion 164 and adjacent to the shaped female aperture 160. The interface board 170 of the illustrated embodiment is captured between the top and bottom frame portions 152 and 154. The interface board 170 receives power through or from the circuitry in the driver assembly 156 when the driver assembly is attached to the lamp housing assembly. The interface board 170 of the illustrated embodiment has electrical connectors 172 project partially in the shaped female aperture 160 and positioned to engage and electrically connect to mating electrical connectors on the male interlocking member 158 when the driver assembly is in the installed position as discussed above (with the male interlocking member in a 90-degrees misaligned orientation relative to the shaped female aperture 160). The electrical connectors 172 are shown in FIG. 18 as being a pair of pins, although other connectors can be used in other embodiments.

Figure 19:
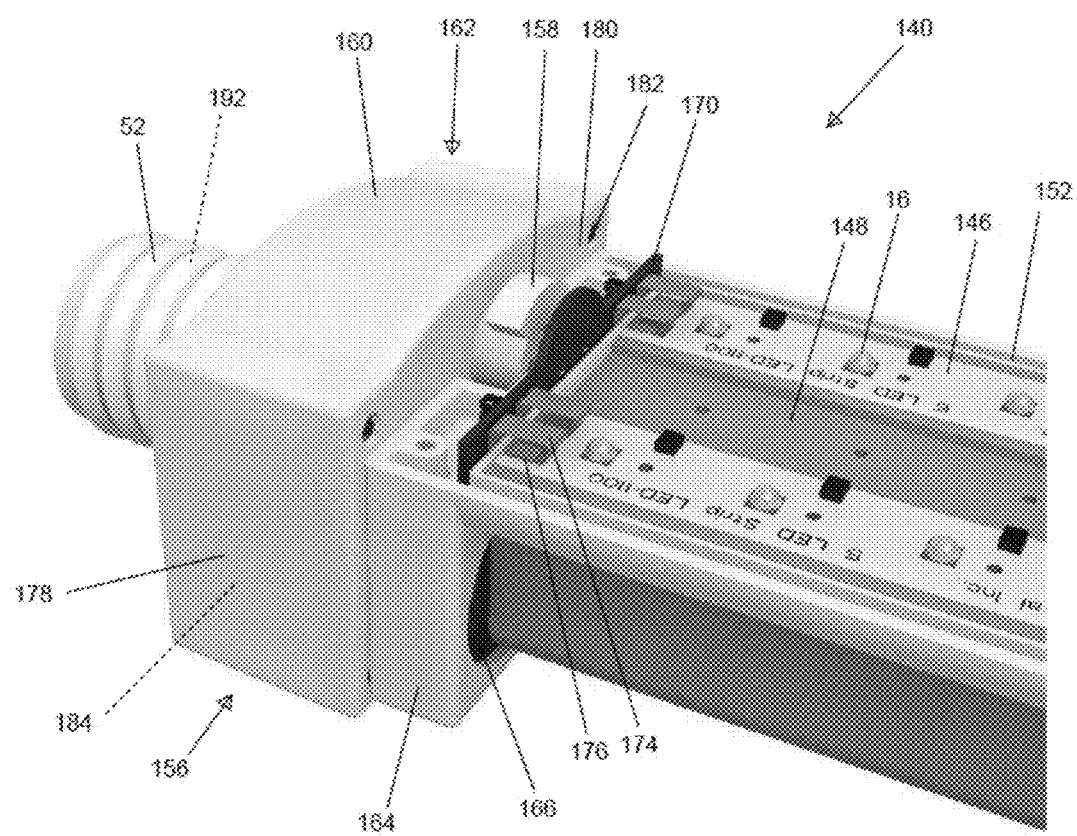
FIG. 19 is an enlarged partial front isometric view of the lamp assembly of FIG. 16 with a portion of the lamp housing not shown.

FIG. 19 is an isometric view of the lamp assembly 140 without the bottom frame portion 154 of the lamp housing 144 shown to illustrate the interface board 170 in position relative to the top frame portion 152, the driver assembly 156, and the LED chip boards 146. The interface board 170 is also electrically connected to the fans 166 (FIG. 18), such that electricity is provided through the electrical connectors 172, through the interface board to each fan 160. The interface board 170 also includes electrical spring clips 174 coupled to the electrical connectors and positioned to electrically engage connector pads 176 on the LED chip boards 146. These spring clips 174 maintain electrical contact with the LED chip boards to provide electricity to the LED lights 16 when the driver assembly 156 is in the light fixture 1 (FIG. 1) and is connected to the lamp housing assembly 142. The interface board 170 can include electrical components, such as control circuitry, between the electrical connectors 172 and the spring clips 174 and/or the connector pads to control electricity flow in the lamp housing assembly 142.

Figure 20A:
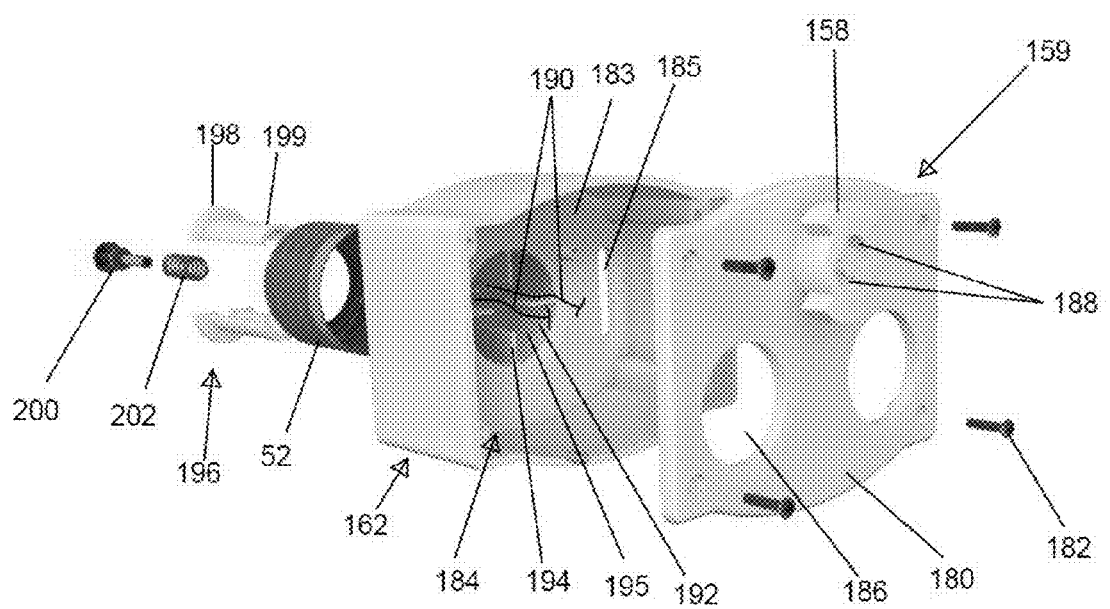
FIGS. 20A and 20B are enlarged front isometric views of the driver housing of the assembly of FIG. 16, with internal circuitry not shown in FIG. 20A for purposes of clarity.
Figure 20B:
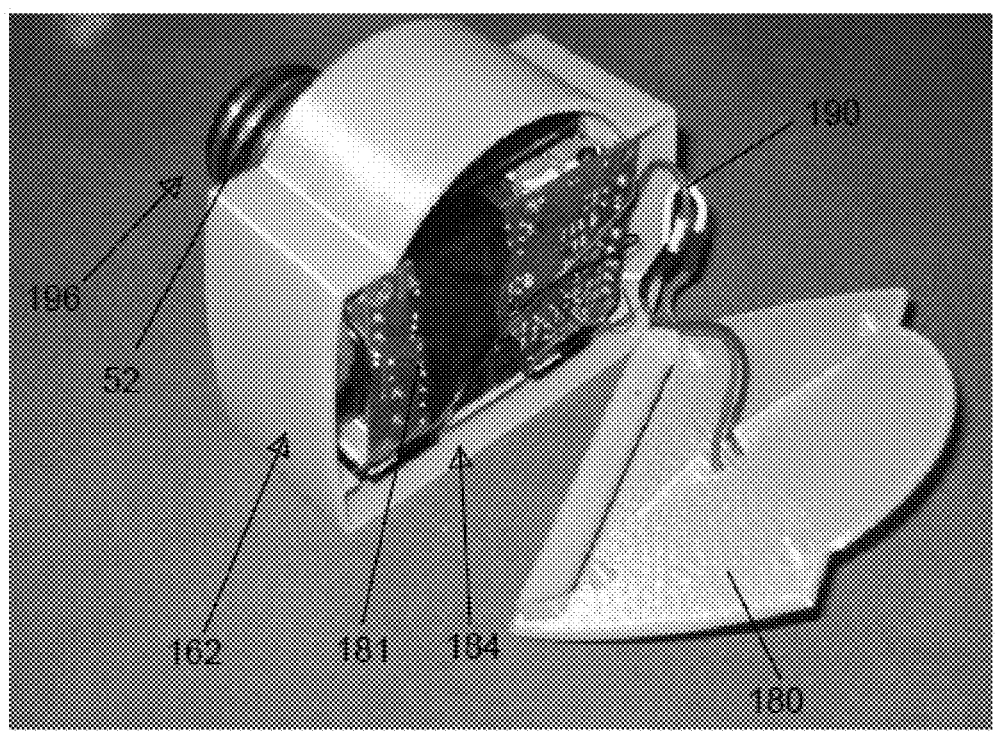

FIGS. 20A and 20B are enlarged front isometric views of the driver assembly 156 separated from the lamp housing assembly 142 of FIG. 16. The driver housing 162 has a housing body 178 that contains internal driver circuitry 181 (FIG. 20B), and a front plate 180 that carries the male interlocking member 158 is attached to the housing body 178 to close off the interior area 184 of the driver housing 162. In the illustrated embodiment, the front plate 180 is removeably fastened to the housing body 178 with fasteners 182, such that the front plate can be removed to access the internal driver circuitry when if or when needed. The front plate 180 has a pair of air flow apertures 186 that align with the fans 166 (FIG. 18) when the driver assembly 156 and the lamp housing assembly 142 are engaged and in the installed position. The rear wall 183 of the housing body 178 also has a pair of rear apertures 185 generally aligned with the fan apertures 186 in the front plate 180. The rear apertures 185 allow air to be drawn by the fans 166 into and through the housing's interior area 184, through the fan apertures 186 in the front plate 180, through the fans 166, and get pushed through the heat sink 150.

The front plate 180 in the illustrated embodiment is integrally attached to the male interlocking member 158. As seen in FIG. 20, the male interlocking member 158 has a pair of curved channels 188 shaped and positioned to receive the pins forming the electrical connectors 172. These curved channels 188 are shaped to allow the lamp housing assembly 142 to rotate the 90 degrees during the installation or removal process while maintaining electrical contact between the driver assembly and the lamp housing assembly 142. The curved channels 188 are connected to electrical elements that, in turn are connected to wires 190 extending through the housings interior area 184 and into the base assembly 191 attached to the rear wall 183 of the driver housing 178.

As best seen in FIGS. 18 and 20A, the base assembly 191 of the illustrated embodiment has a hollow base portion 192 integrally connected to the housing's rear wall 183. The wires 190 extending through the interior area 184 also extend rearwardly through the hollow base portion 192. In the illustrated embodiment, the hollow base portion 192 includes internal fins 194 extending radially inwardly so as to define divided chambers 195 within the hollow base portion 192. These divided chambers 195 can receive the individual wires 190 extending therethrough to help keep the wires separated and spaced apart from each other within the driver housing 162, thereby helping to maintain wire management therein. These divided chambers also help keep the wires separated near the rear ends where the wires connect to the electrical contact portions of the base.

The hollow base portion 192 is sized to receive the threaded sleeve 52, which electrically connects to at least one of the wires 190 that extends through one of the divided chambers. As discussed above, the sleeve 52 operatively connected to one of the electrical contact points between the light assembly and the light fixture 1 (FIG. 1). The hollow base portion 192 also receives therein a retractable tip assembly 196. In the illustrated embodiment, the retractable tip assembly 196 has a sleeve 198 that extends into the rear portion of the hollow base portion 192. The sleeve 198 can include one or more slots 199 that align with and receive the internal fins 194 in the base portion, so that the internal fins engage and firmly hold the sleeve in axial alignment within the base portion. When the sleeve 198 is positioned in the base portion, the sleeve works with the internal fins to fully separate and isolate the divided chambers 195 from each other.

The sleeve 198 is a hollow component that slidably receives a biased, electrically conductive retractable tip 200 that defines the second electrical contact point with another electrically conductive portion of the socket 51 of the light fixture 1 (FIG. 1). The sleeve 198 also contains the biasing member, such as a spring 202, that urges the retractable tip 200 rearwardly away from the base toward an extended position. The forward portion of the retractable tip 200 is captured within the sleeve 198 and is electrically connected to at least one wire 190 extending into the front end of the sleeve. Accordingly, this wire 190 connected to the retractable tip is physically and electrically isolated from the other wire 190 that extends through one of the divided chambers and is electrically connected to the electrically conductive threaded sleeve 52. The biased retractable tip 200 is configured to compress the spring 202 and move axially into the hollow base portion 192, similar to the arrangement discussed above. Accordingly, the retractable tip 200 makes electrical contact with the light fixture's socket, and the spring 202 biases the tip 200 against the fixture's electrical contact. The spring 202 also acts as a tensioner to keep the threads of the sleeve 52 in firm engagement with the mating threads in the light fixture's socket. This retractable tip arrangement also allows the lamp assembly 140 to rotate relative to the light fixture to rotationally position the lamp housing assembly 142 in a desired or proper orientation as discussed above.

Figure 21:
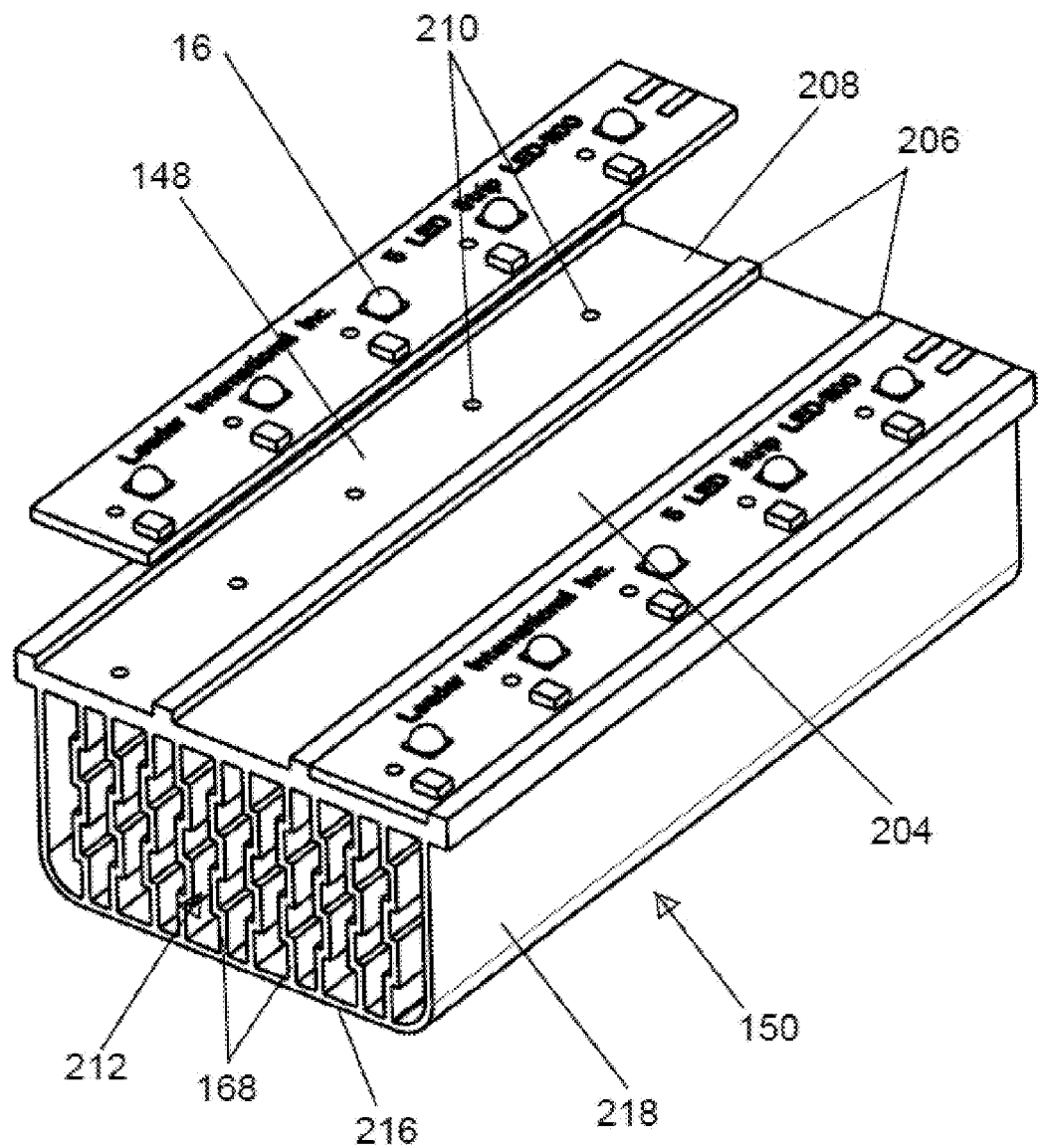
FIG. 21 is a partial exploded isometric view of the heat sink and two LED chip boards, shown removed from the assembly of FIG. 16.

FIG. 21 is a partial exploded isometric view of the heat sink 150 and two LED chip boards 146, shown removed from the assembly of FIG. 16. The base 204 of the heat sink 150 has ridges 206 that define channels 208 that receive the LED chip boards 146, so the chip boards are held in proper alignment directly on the heat sink's base 204. In the illustrated embodiment, the ridges 206 have substantially the same thickness as the LED chip boards 146 so the chip boards are effectively recessed and flush with the surface of the heat sink ridges 206. In the illustrated embodiment, the base 204 has a plurality of apertures 210 aligned with the plurality of apertures 211 in the LED chip boards 146. These apertures 210 and 211, and the LED lights 16, are also axially aligned with air columns 212 defined by the space between contoured fins 168 of the heat sink 150. In the illustrated embodiment, the contoured fins 168 are generally aligned with the edge portion of the LED lights, so that the fins 168 can efficiently conduct heat away from the LED light 16 and the area of the LED chip board 146 carrying the LED light 16. The contoured fins 168 provide for an increased surface area in the heat sink from which to dissipate heat generated by the LED lights 16 and chip boards 146.

As seen in FIGS. 18 and 19, the air columns 212 between the contoured fins 168 extending longitudinally along the full length of the heat sink 150, and the entrance to the air columns 212 are immediately adjacent to the fans 166. Accordingly, the fans 166 drive airflow directly into the heat sink's air columns 212 and over surface of the fins 168, thereby efficiently drawing heat away from the LED chip boards 146 and keeping the heat of the lamp assembly 140 to a minimum. The heat sink 150 is configured to very efficiently and effectively draw heat away from the LED chip boards 146 during operation of the lamp assembly, such that the fans 166 may not be needed in some environments or operating conditions. In some embodiments, the lamp assembly can be provided without the fans 166 adjacent to the heat sink 150.

The heat sink 150 of the illustrated embodiment is a unitary member with the fins 168 integrally connected at one end to the base 204 and integrally connected at the other end to a top portion 216. The base 204 and top portion 216 are also connected to side walls 218 extending therebetween and generally parallel to the fins 168.

Figure 22:
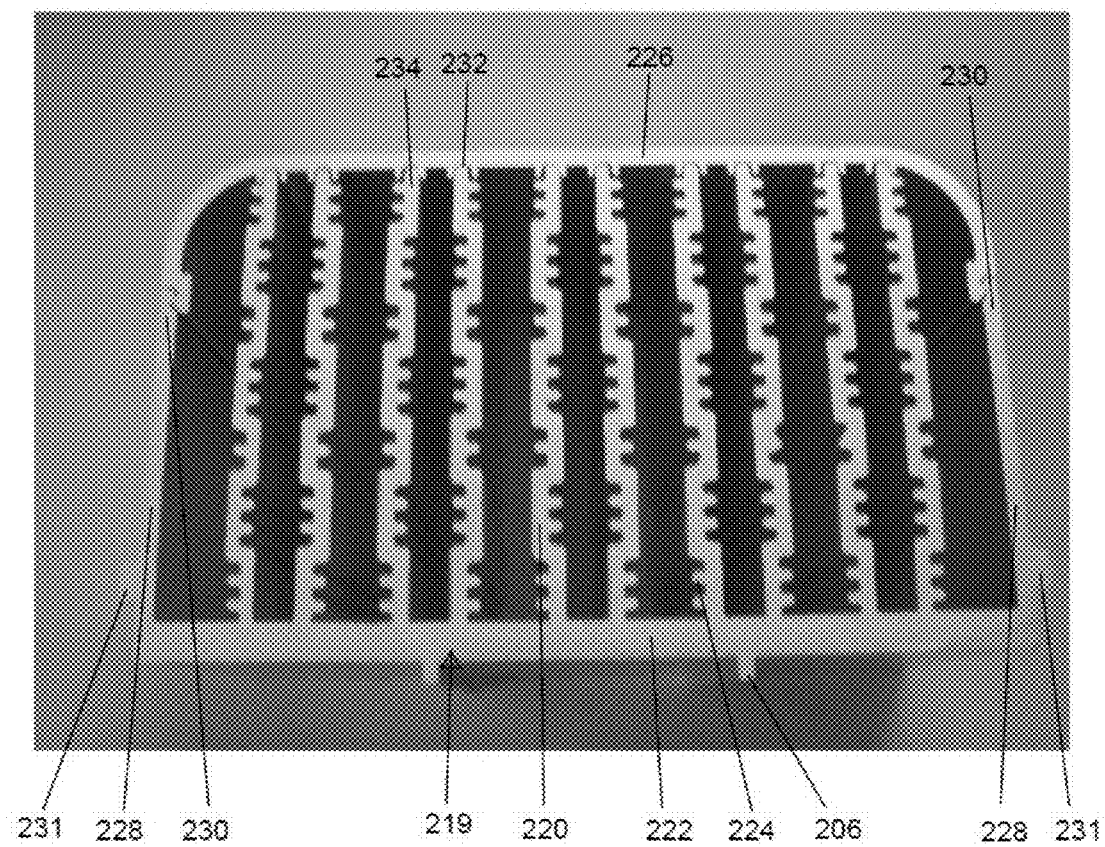
FIG. 22 is an end view of a heat sink in accordance with another embodiment shown removed from the assembly of FIG. 16.

FIG. 22 is an end view of a heat sink 219 in accordance with another embodiment. The heat sink 219 has contoured fins 220 projecting away from the base 222. The contoured fins 220 each include a plurality of longitudinal ridges 224 that increase the surface area of the fins 220 and that are substantially parallel to the airflow direction through the heat sink 219 during operation of the lamp assembly 140. The heat sink 219 also has a removable top portion 226 connected to top edges 228 of the sidewalls 230. The sidewalls 230 of the illustrated embodiment have external support ribs 231 configured to engage the bottom frame portion 154 of the lamp housing 144 (FIG. 18) to support the heat sink on the frame portion. The heat sink's top portion 226 also has a plurality of channels 232 that removeably receive top edges 234 of the contoured fins 220. The channels 232 substantially restrain the fins from lateral movement relative to the base 222. This removable top portion 226 can be configured to decrease the cost and/or complexity of manufacturing the heat sink 219.

Figure 23:
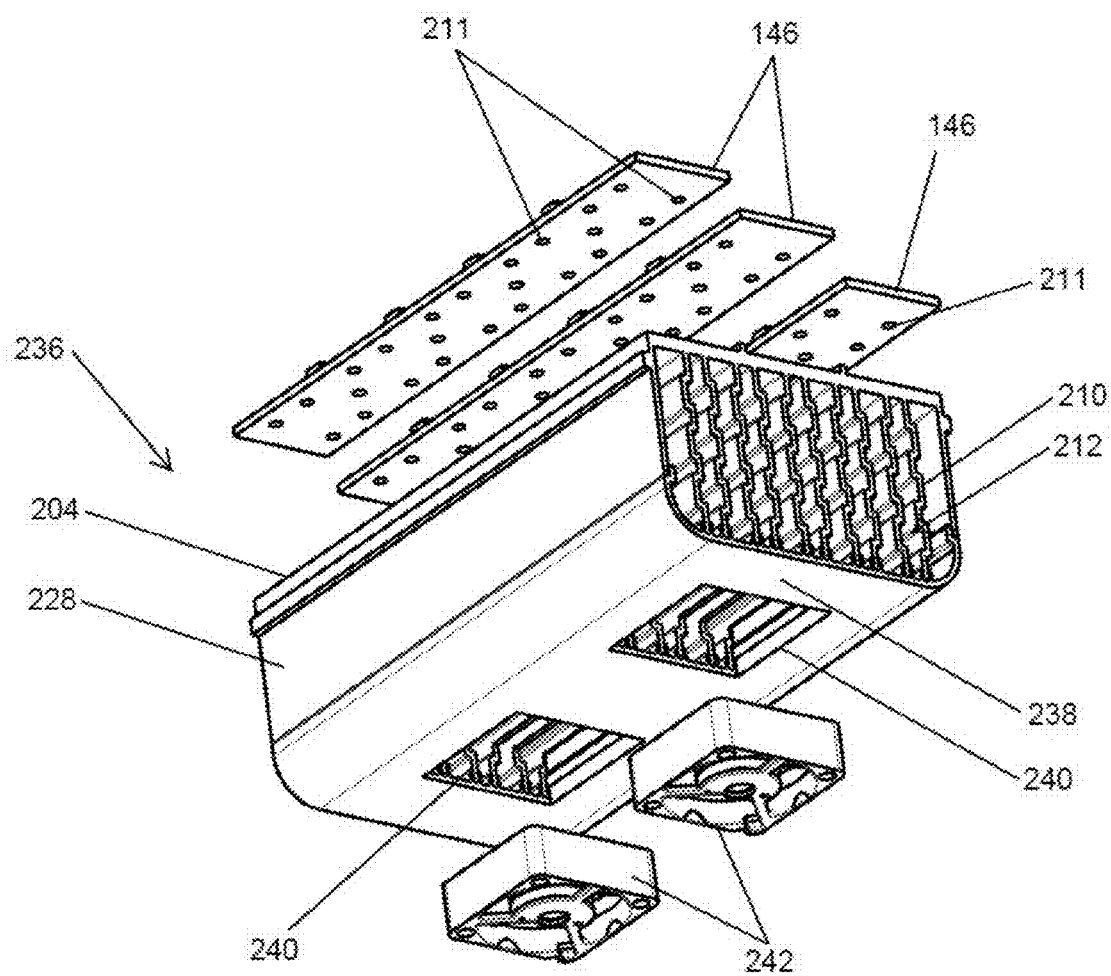
FIGS. 23 and 24 are partially exploded isometric views of a heat sink and LED chip boards in accordance with another embodiment.
Figure 24:
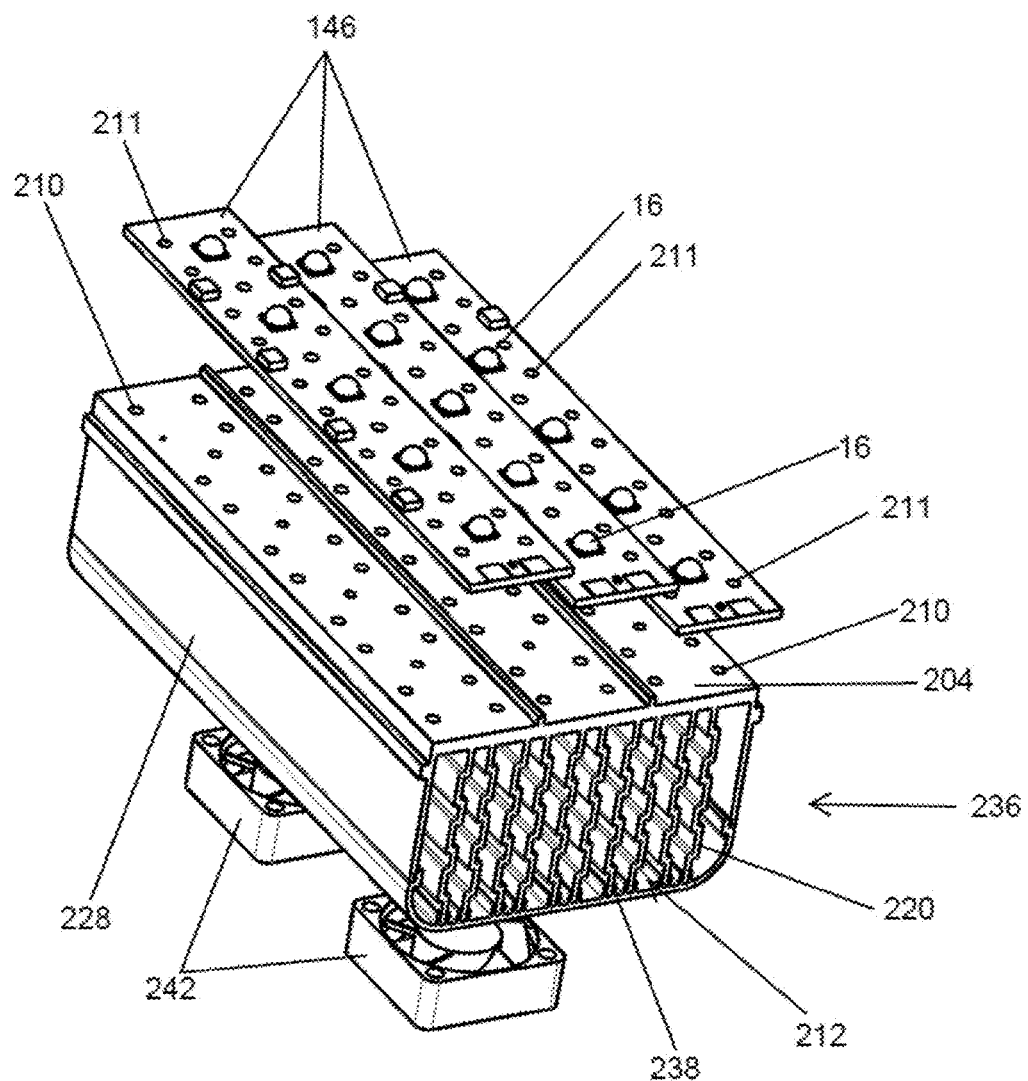

FIGS. 23 and 24 are partially exploded isometric views of a heat sink 236 in accordance with another embodiment. The illustrated heat sink 236 has a base 204 that supports the LED chip boards 146 similar to the heat sinks 150 and 219 of FIGS. 21 and 22. The base 204 includes a plurality of apertures 210 (FIG. 24) aligned with the air columns 212 defined by the space between the contoured fins 220, such that the apertures 210 do not interfere with the fins 220 connected to and projecting away from the base 204. The LED lights 16 (FIG. 24) are also aligned with the air columns 212. The apertures 210 are coaxially aligned with the apertures 211 in the LED chip boards 146.

The top portion 238 of the heat sink 236 of the illustrated embodiment has a pair of apertures 240 (FIG. 23) each shaped and sized to receive a fan 242 therein. The fans 242 are positioned to blow air into the air columns 212 of the heat sink, thereby creating airflow over the fins 220. The airflow also flows through the apertures 210 and 211 in the heat sink's base 204 and the LED chip boards 146, respectively, thereby pushing air away from the lights 16 in the direction of illumination. In one embodiment, the heat sink 236 is mounted in the lamp housing 142 (FIG. 16) and a portion of the lamp housing 142 can define one or more end structures immediately adjacent to one or both ends of the heat sink 236. The end structures, such as end caps, can block airflow from exiting the air columns 212, thereby driving the airflow through the apertures in the base 204 and the LED chip boards 146. The end caps can be configured to allow for some air to move laterally out of the air columns so as to selectively control the airflow out the ends of the heat sink 236 as well as the airflow passing through the apertures 210 and 211 in the base 204 and LED chip boards 146.

The heat sink 236 can include a wire chase to protect and route wires from the fans 242 to a power source for the fans, such as the interface board 170 in the lamp housing 14 (FIGS. 16 and 17). In the illustrated embodiment, portions of the fins 220 are shaped to form a recess that receives the fans 242. This recessed arrangement can provide a flush fit for the fans 242 in the top portion of the heat sink. In other embodiments, the fans 242 may not be fully or partially recessed in the heat sink 236. The heat sink's top portion 238 of the illustrated embodiment is removably attached to the sidewalls 228, similar to the heat sink 236 of FIG. 22. In other embodiments, the top portion 238 can be integrally connected to the sidewalls and to the contoured fins, similar to the heat sink configuration of FIG. 21.

The illustrated embodiment shows two fans 242, such as electric, sealed, dust resistant fans made by Sunon®, mounted in the top portion 238 of the heat sink 236. Other embodiments can include a single fan mounted in the heat sink 236, and yet other embodiments can include more than two fans mounted to the heat sink 236 to drive air through the heat sink and through the LED chip boards 146. This airflow through the heat sink 236, the base 204, and the LED chip boards 146 provides a more efficient thermally dynamic coefficient of heat removal from the chip boards 146 at least in part by creating increased turbulent air flow over an increased surface area allowing the heat drawn from the LED chip boards 146 to be expelled downward away from the heat sink 236, the base panel 204 and the LED chip boards 146. This results in increasing the assembly's thermal efficiency and substantially lowering the thermal temperature of the heat sink 236, the LED chip boards 146, and the lights 16, which results in extending the working life of LED chip boards 146. This configuration also drives heat in the direction of illumination.

When the lamps are positioned in or adjacent to a ceiling structure of a building space and facing downwardly, the downward flow of heated air and can also greatly reduce the thermal stratification/de-stratification that can occur in large rooms, such as warehouses, hangars, large box stores (e.g., Costco), auditoriums, large greenhouses, etc. Accordingly, the lamp assemblies allow the HVAC systems to better or more efficiently balance the inner-environment space and even out environmental temperatures, thereby reducing the number of ceiling fans in new installations and possibly allow removal in existing spaces where ceiling fans are currently installed. Embodiments of the lamp assemblies provide additional benefits, including a substantial weight reduction compared to conventional lamps that include ballast (which can weigh approximately 9-12 lbs., a capacitor, an igniter, and the associated wiring. In at least one embodiment, a lamp assembly for a hi-bay light fixture can provide a weight savings of approximately 11-14 lbs per fixture. In a large building that has approximately 400 hi-bay light fixtures, the lamp assemblies of the present disclosure can provide a reduction of ceiling weight of well over 2 tons. Such a weigh savings can be significant for the structural design for new construction due to a potential reduction of roof load.

Figure 25:
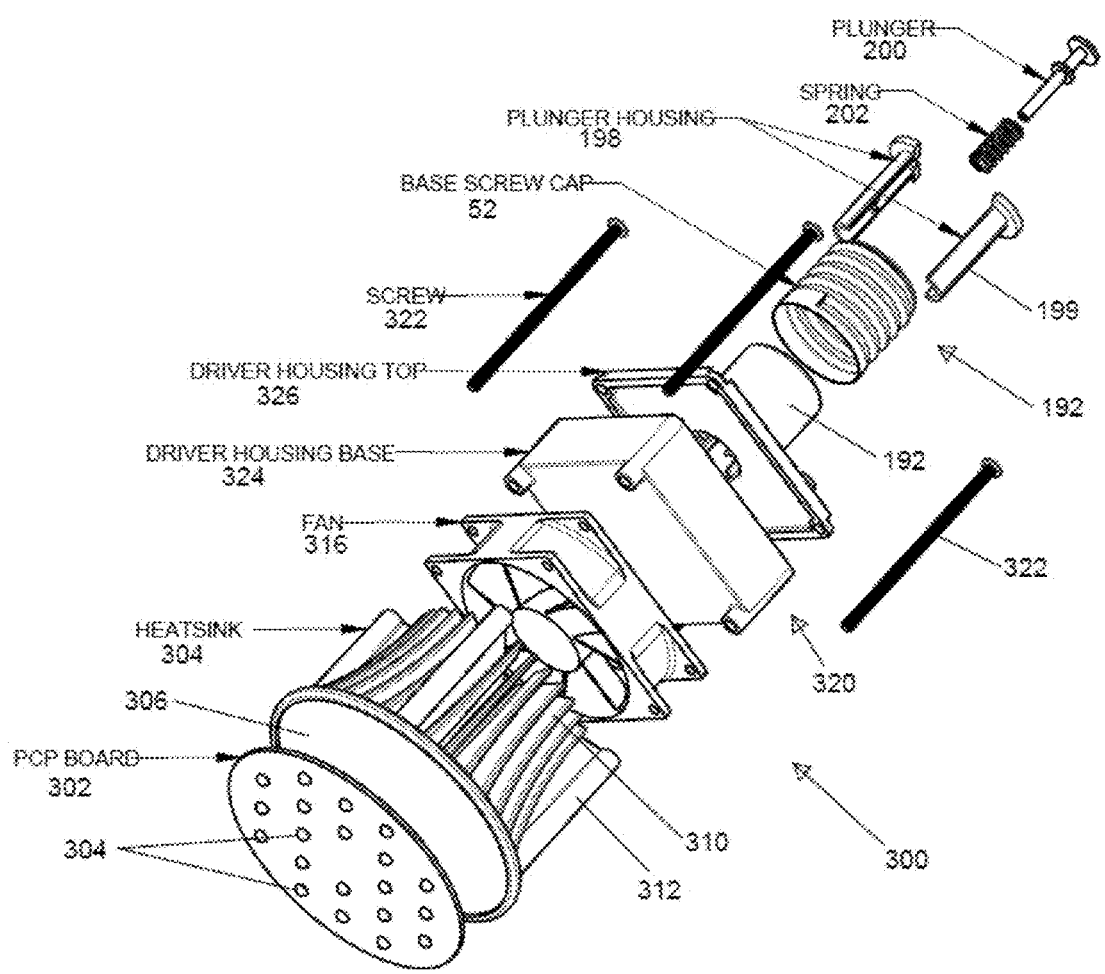
FIG. 25 is an exploded bottom isometric view of an LED-based lamp assembly in accordance with another embodiment.
Figure 26:
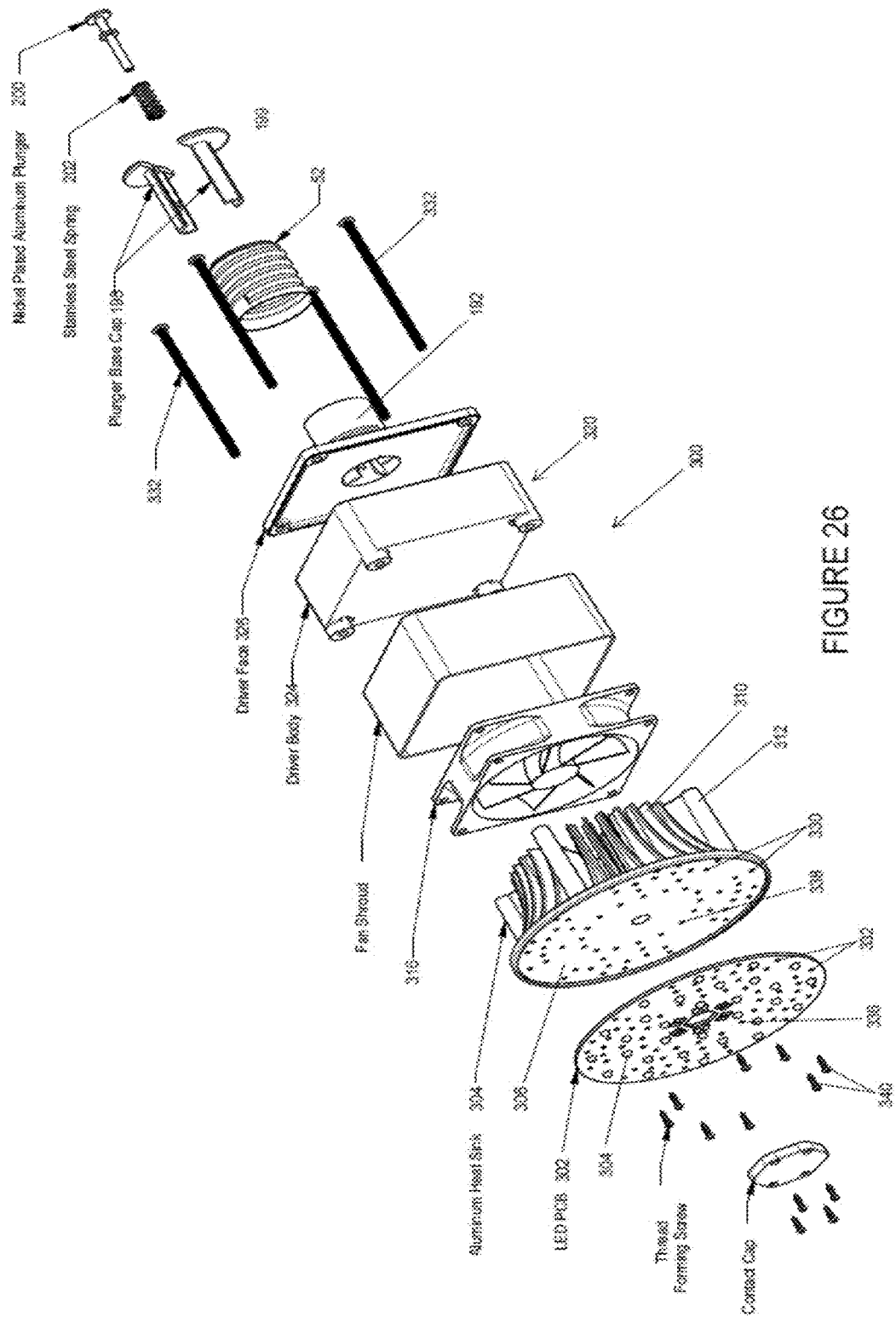
FIG. 26 is an exploded bottom isometric view of an LED-based lamp assembly in accordance with yet another embodiment.
Figure 27:
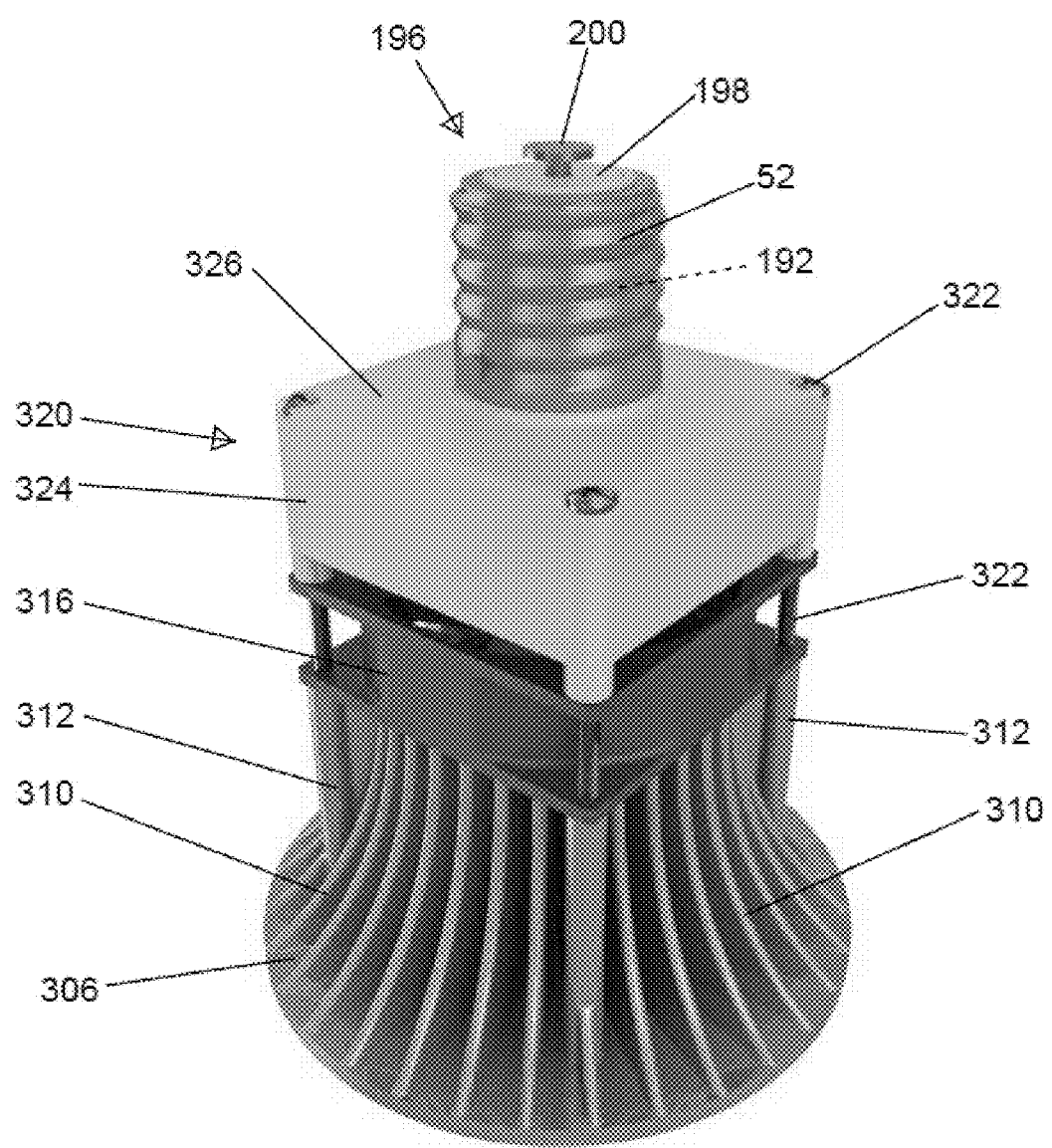
FIG. 27 is a top isometric view of the lamp assembly of FIG. 26.

FIGS. 25-27 are isometric views of an LED-based lamp assembly 300 in accordance other embodiments. The lamp assembly 300 has a substantially circular LED chip board assembly 302 that includes a plurality of LED lights 304 disposed in a selected pattern. The LED chip board assembly 302 is attached to a circular base panel 306 of a heat sink 308. The heat sink 308 has a plurality of radially extending fins 310 connected to and projecting away from the base panel 306. The heat sink 308 also has a plurality of mounting portions 312 projecting away from the base panel 306 and oriented substantially parallel to the fins 310.

The top edges of the fins 310 and the mounting portions 312 of the illustrated embodiment are substantially coplanar and support a fan 316 coaxially aligned with the heat sink 308 and the LED chip board assembly 302. The fan 316 is configured to push airflow downwardly along the fins and through the heat sink 308 to help draw heat from the LED chip board assembly 302 away from the heat sink fins 310. In at least one embodiment, the base panel 306 of the heat sink 308 can have apertures formed therethrough to allows some of the airflow from the fan 316 to flow directly to the LED chip board assembly 302. The fan 316 of the illustrated embodiment can be a sealed, dust resistant, non-bearing, magnetic levitation fan from Sunon® that can provide air flow of approximately 116 cfm. Other embodiments can use other fans or have other airflow performance characteristics to help keep the LED chip board assembly 302 and other components during operation of the lamp assembly.

The fan 316 is operably connected to a driver housing assembly 320. In the illustrated embodiment, the fan 316 is mounted to a driver housing assembly 320 by fasteners 322 that extend through the corners of the driver housing 324, through corners of the fan 316, and extend into and threadably engage the mounting portions 312 of the heat sink 308. Other embodiments can use other fastening techniques for securing the fan 316 between the driver housing 324 and the heat sink 308. In other embodiments, the lamp assembly 300 can be provided without the fan 308, such that the driver housing 324 can be secured directly to the heat sink.

The driver housing 324 has a removable top plate 326 that provides access into the interior area of the driver housing. The top plate 326 is integrally connected to a hollow base portion 192 of a base assembly 191. The base assembly 191 has a configuration substantially as discussed above with the internal fins 194 defining the divided chambers 195 in the hollow base portion 192, the threaded sleeve 52, and the retractable tip assembly 196 to operatively and removably connect the lamp assembly 300 to the light fixture 1 (FIG. 1).

FIG. 26 illustrates an alternate embodiment wherein the circular base panel 306 of the heat sink 308 includes a plurality of apertures 330 axially aligned with spaces between the radially extending fins 310. The LED chip board assembly 302 also includes a plurality of apertures 332 aligned with the apertures 330 of the base panel 306 such that airflow from the fan 316 can move axially over the fins 310 and through the aligned apertures 330 and 332, thereby driving air through the LED chip board assembly 302 to carry heat away from the PCB chip board and the associated LED lights 304. In at least one embodiment the LED chip board assembly 302 can be a standard metal core board constructed of Aluminum or other such thermal-advantaged metal or can be a SinkPad® metal core board of various type metals.

In at least one embodiment, the LED chip board assembly 302 can be an integral component of the heat sink 308. For example, the LED chip board 302 can include integrated circuits and associated components printed or applied directly onto the base panel 306 of the heat sink 308, such that an additional conventional printed circuit board is not attached or otherwise fixed to a separate base panel of the heat sink. In this alternate embodiment, the air passageways carrying heated air away from the heat sink 308 can be provided in the base panel onto which the integrated circuitry and lights and associated components are mounted. In yet other embodiments, the LED chip board can be formed by other dynamic LED chip board arrangements, such as CarbAl®, a nano-level product combining carbon and aluminum.

In the illustrated embodiment, the LED chip board assembly 302 has an equal number of thru-holes that provide an exact match to the number of thru-holes in base panel 306. The LED chip board assembly 302 also has a plurality of fastener holes 336 that align and match a plurality of fastener holes 338 in the base panel 306 a plurality of fasteners 340, special thread-forming screws, extend through the fastener holes 336 and 338 to fasten the LED chip board assembly 302 directly to the base panel 306. In other embodiments the heat sink 308 and the LED chip board assembly 302 can include a registration means, such as notches, lines, or a non-symmetrical shape, that ensure the LED chip board assembly 302 will be properly positioned and registered on the circular base panel 306 with the apertures 330 and 332 in axial alignment.

The apertures 330 and 332 in the base panel 306 and LED chip board assembly 302 can vary in diameter and position relative to the LED lights 304 so as to provide selective airflow and a direct cooling effect on the LED chip board assembly 302. The apertures 330 in the base panel 306 are positioned to align with the spaces between the fins 310 so that the apertures do not interfere with the fins 310. In addition, the apertures in the base panel and/or the LED chip board assembly 302 are positioned so as to not interfere with the LED lights 304 while allowing the air flow to draw heat away the integrated circuits, the lights, and associated components.

Similar to the embodiment discussed above in connection with FIGS. 23 and 24, this configuration with the aligned apertures 330 and 332 in the heat sink 308 and LED chip board assembly 302 provides an increased thermal advantage by allowing air from the fan 316 to pass downward along the fins 310, through the heat sink's base panel 306 and the LED chip board assembly 302, thereby drawing and pushing the heat away from the LED chips 304 in the direction of illumination. The result is a more efficient thermally dynamic coefficient of heat removal from the LED chip board assembly 302 via the increased turbulence over a greater surface area, which substantially lowers the thermal temperature of the heat sink 304, LED chip board assembly 302 and associated LED lights 304, and which extends the working life of the LED chip board assembly 304. This configuration is also very effective at greatly reducing the weight of the light fixtures as well as reducing the thermal stratification/de-stratification that can occur in large rooms, such as warehouses, hangars, large box stores (e.g., Costco), auditoriums, large greenhouses, etc., as discussed above.

Figure 28:
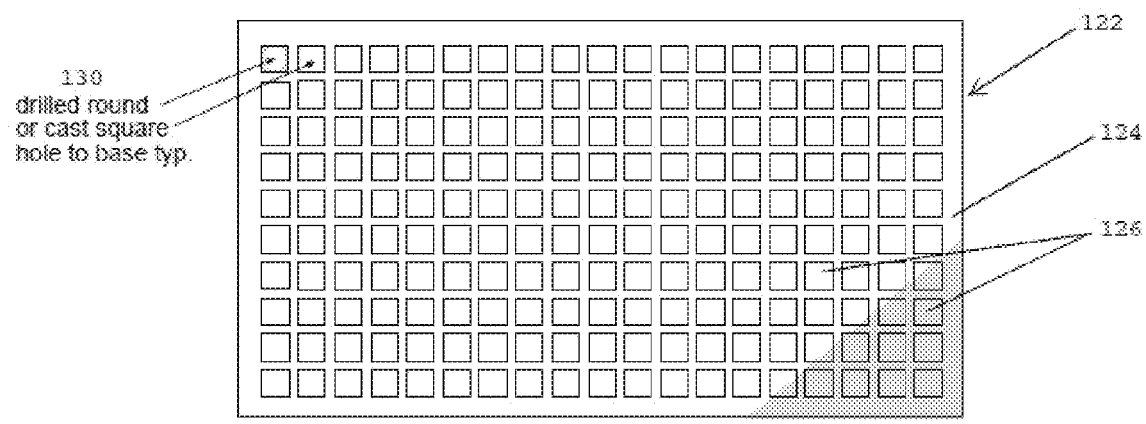
FIG. 28 is a plan view of a heat sink of an LED-based lamp assembly of another embodiment.
Figure 29:
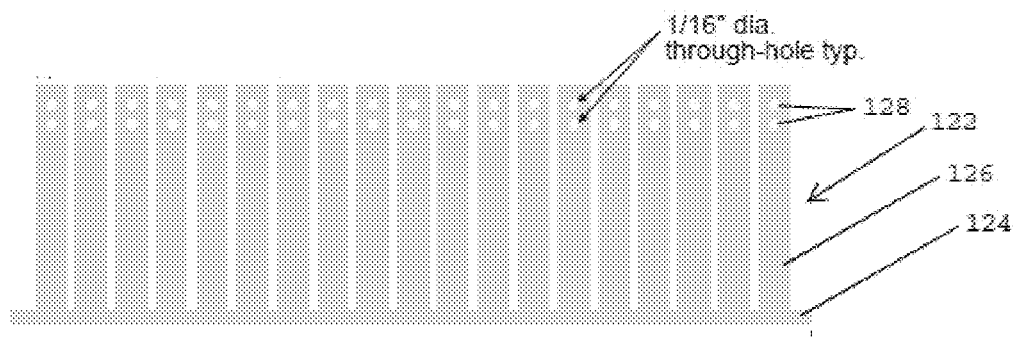
FIGS. 29 and 30 are side and end elevation views of the heat sink of FIG. 28.
Figure 30:
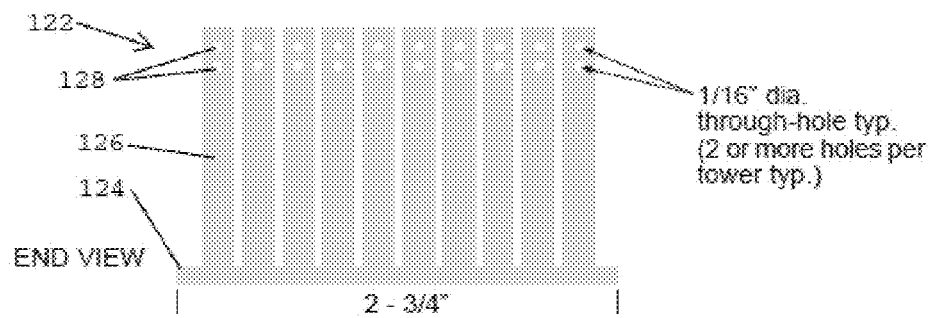

FIG. 28 is a plan view of a heat sink of an LED-based lamp assembly of another embodiment. FIGS. 29 and 30 are side and end elevation views of the heat sink of FIG. 29. In at least one embodiment, the LED lamp assembly 10 includes an improved heat sink 122 that has a base plate 124 that mounts to the lamp housing as discussed above. The heat sink 122 includes a plurality of heat dissipating fins or towers 126 projecting from the base plate 124. The base plate 124 and the towers 126 are made from Aluminum, Aluminum alloy, or other suitable material. As seen in FIGS. 29 and 30, a plurality of holes 128 extend through the top portions of the towers 126. The holes 128 in the illustrated embodiment are substantially parallel to the base plate 124. Other embodiments can have the holes in other locations or orientations. The holes 128 act to increase the effective surface area of the heat sink 122, thereby increasing its heat-dissipating effectiveness. In one embodiment, the towers 126 can also have holes 130 therein perpendicular to the base plate 124, such that a portion of the tower 126 is hollow. This hollow or partially hollow construction can also increase the effective surface area of the heat sink 122.

From the foregoing, it will be appreciated that specific embodiments of the invention have been described herein for purposes of illustration, but that various modifications may be made without deviating from the invention. Additionally, aspects of the invention described in the context of particular embodiments or examples may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

We claim:

1. An LED-based lamp assembly for use with a light fixture having a socket portion, the lamp assembly comprising:
a driver assembly having a base portion rotatably engageable with the socket portion to make a first electrical contact with the light fixture, the base portion coupled to a driver housing, the driver assembly having an electrically conductive tip portion coupled to the base portion, the tip portion being engageable with the socket portion to make a second electrical contact with the light fixture, the tip portion and driver housing being moveable relative to each other when the tip portion is in the second electrical contact with the socket portion, the driver assembly having first electrical contacts;
a lamp housing assembly operably connected to the driver assembly, the lamp housing assembly having second electrical contacts operatively connected to the first electrical contacts of the driver assembly, the lamp housing assembly being coupled to at least one LED substrate having at least one LED light thereon, the LED substrate being connected to a heat sink configured to carry heat away from the LED substrate; and
at least one fan electrically connected to the driver assembly and oriented to move air across the heat sink when activated.

2. The assembly of claim 1 wherein the heat sink comprises a support portion and a plurality of fins coupled to the support portion and configured to form air columns between adjacent fins, the heat sink having a plurality of first apertures in communication with the air columns, and the LED substrate has a plurality of second apertures therethrough and in alignment with the plurality of first apertures, wherein the fan is positioned to move air through the air columns in the heat sink and through the plurality of first and second apertures to move a flow of heated air away from the LED substrate.

3. The assembly of claim 1 wherein the lamp housing assembly is moveable relative to the light fixture and tip portion to adjust the angular position of the LED substrate while maintaining the first and second electrical contacts between the base and the socket portion.

4. The assembly of claim 1 wherein the lamp housing assembly is configured to be rotatable relative to the tip portion.

5. The assembly of claim 1 wherein the tip portion is moveable relative to the driver housing to permit angular adjustment of LED substrate relative to the light fixture while maintaining the first and second electrical contacts between the driver assembly and the socket portion.

6. The assembly of claim 1 wherein the tip portion is moveable axially relative to the driver housing.

7. The assembly of claim 1 wherein the fan is positioned in alignment with the heat sink.

8. The assembly of claim 1 wherein the lamp housing assembly is removeably connected to the driver assembly, the lamp housing assembly being removable from the driver assembly while the driver assembly is connected to the light fixture.

9. The assembly of claim 1 wherein the LED substrate is a substantially planar member carried on a planar portion of the heat sink.

10. The assembly of claim 1 wherein the driver assembly has a first connection member that releasably mates with a portion of the lamp housing assembly.

11. The assembly of claim 1 wherein the the tip portion of the driver assembly is retractable relative to the base portion after the tip portion electrically engages the socket portion and before the base portion is fully screwed into the socket portion.

12. The assembly of claim 1 wherein the LED substrate and heat sink are rotatable as a unit relative to the light fixture to adjust the angular position of the at least one LED light while maintaining electrical engagement between the tip portion and the socket portion.

13. The assembly of claim 1 wherein the heat sink has a plurality of contoured fins spaced apart from each other, the at least one LED light being positioned on the LED substrate in alignment with at least one of the contoured fins.

14. The assembly of claim 1 wherein the driver assembly has a first connection member that releasably mates with a portion of the lamp housing assembly.

15. An LED-based lamp assembly for use with a light fixture having a socket portion, the lamp assembly comprising:
- a driver assembly having a driver, a driver housing containing the driver;
- a base portion connected to the driver housing and electrically coupled to the driver assembly, the base portion having an electrically conductive first threaded portion coupled to the driver assembly and rotatably engageable with the socket portion to make a first electrical contact with the light fixture, the base portion having an electrically conductive tip portion electrically coupled to the driver assembly and electrically isolated from the first threaded portion, the tip portion being engageable with the socket portion to make a second electrical contact with the light fixture, the base and the driver assembly being moveable relative to each other when the tip portion is in the second electrical contact with the socket portion, the driver assembly having first electrical contacts;
- a lamp housing assembly operably connected to the driver assembly, the lamp housing assembly having second electrical contacts operatively connected to the first electrical contacts of the driver assembly, the lamp housing assembly having at least one LED substrate with at least one LED light thereon, the LED substrate being operatively coupled to the driver;
- a heat sink connected to the lamp housing assembly and thermally coupled to the at least one LED substrate and configured to carry heat away from the LED substrate; and
- at least one fan electrically connected to the driver assembly and oriented to move air across the heat sink when activated.

16. The assembly of claim 15 wherein the lamp housing assembly is moveable relative to the light fixture and tip portion to adjust the angular position of the LED substrate while maintaining the first and second electrical contacts between the base and the socket portion.

17. The assembly of claim 15 wherein the lamp housing assembly is rotatable relative to the tip portion.

18. The assembly of claim 15 wherein the tip portion is moveable relative to the driver housing to permit angular adjustment of the LED substrate relative to the light fixture while maintaining the first and second electrical contacts between the driver assembly and the socket portion.

19. The assembly of claim 15 wherein the tip portion is axially moveable relative to the electrically conductive first threaded portion.

20. The assembly of claim 15 wherein the lamp housing assembly is removeably connected to the driver assembly, the lamp housing assembly being removable from the driver assembly while the base portion is connected to the driver assembly and to the light fixture.

* * * * *